United States Patent
Eidem et al.

(10) Patent No.: US 10,652,170 B2
(45) Date of Patent: May 12, 2020

(54) MODIFICATION OF AUDIO-BASED COMPUTER PROGRAM OUTPUT

(71) Applicant: Google Inc., Mountain View, CA (US)

(72) Inventors: Laura Eidem, Mountain View, CA (US); Alex Jacobson, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/618,842

(22) Filed: Jun. 9, 2017

(65) Prior Publication Data

US 2018/0359198 A1 Dec. 13, 2018

(51) Int. Cl.

| H04L 12/58 | (2006.01) |
|---|---|
| G06F 3/16 | (2006.01) |
| G06F 17/27 | (2006.01) |
| G10L 13/08 | (2013.01) |
| H04L 29/08 | (2006.01) |
| G06F 21/62 | (2013.01) |

(52) U.S. Cl.
CPC ............ *H04L 51/02* (2013.01); *G06F 3/16* (2013.01); *G06F 3/167* (2013.01); *G06F 17/271* (2013.01); *G06F 17/274* (2013.01); *G10L 13/08* (2013.01); *H04L 67/306* (2013.01); *G06F 21/6218* (2013.01)

(58) Field of Classification Search
CPC ....................................................... H04L 51/02
USPC ........................................................ 709/206
See application file for complete search history.

(56) References Cited

U.S. PATENT DOCUMENTS

| 5,853,005 A * | 12/1998 | Scanlon ................ A61B 5/113 600/459 |
|---|---|---|
| 6,085,168 A | 7/2000 | Mori et al. |
| 6,684,249 B1 | 1/2004 | Frerichs et al. |
| 7,136,915 B2 | 11/2006 | Rieger, III |
| 7,137,892 B2 | 11/2006 | Sitrick |
| 7,590,538 B2 | 9/2009 | St. John |
| 8,082,446 B1 | 12/2011 | Carroll |
| 8,428,758 B2 | 4/2013 | Naik et al. |
| 8,738,739 B2 | 5/2014 | Makar et al. |
| 8,788,263 B1 | 7/2014 | Richfield |
| 8,811,329 B2 | 8/2014 | Haddad |

(Continued)

FOREIGN PATENT DOCUMENTS

| EP | 2 881 898 | 6/2015 |
|---|---|---|
| EP | 2 955 643 | 12/2015 |

(Continued)

OTHER PUBLICATIONS

Merriam-Webster, "placeholder", 2019 (Year: 2019).*

(Continued)

*Primary Examiner* — Ondrej C Vostal
(74) *Attorney, Agent, or Firm* — Foley & Lardner LLP; James De Vellis

(57) ABSTRACT

Modifying computer program output in a voice or non-text input activated environment is provided. A system can receive audio signals detected by a microphone of a device. The system can parse the audio signal to identify a computer program to invoke. The computer program can identify a dialog data structure. The system can modify the identified dialog data structure to include a content item. The system can provide the modified dialog data structure to a computing device for presentation.

18 Claims, 10 Drawing Sheets

(56) References Cited

U.S. PATENT DOCUMENTS

| | | | |
|---|---|---|---|
| 9,123,338 B1* | 9/2015 | Sanders | H04M 3/4936 |
| 9,208,153 B1* | 12/2015 | Zaveri | G06Q 10/101 |
| 9,584,946 B1* | 2/2017 | Lyren | H04S 7/30 |
| 9,865,260 B1 | 1/2018 | Vuskovic et al. | |
| 10,021,245 B1 | 7/2018 | Koster et al. | |
| 10,162,817 B2* | 12/2018 | Schlesinger | G06F 17/28 |
| 10,187,337 B2 | 1/2019 | Smullen et al. | |
| 10,203,861 B2 | 2/2019 | Kilchenko et al. | |
| 10,257,151 B2 | 4/2019 | Morrison et al. | |
| 2002/0057678 A1* | 5/2002 | Jiang | H04L 12/66 370/353 |
| 2002/0062393 A1 | 5/2002 | Borger et al. | |
| 2003/0182391 A1 | 9/2003 | Leber et al. | |
| 2005/0278180 A1* | 12/2005 | O'Neill | G10L 15/1822 704/275 |
| 2006/0069546 A1* | 3/2006 | Rosser | G10L 15/22 704/9 |
| 2006/0161278 A1 | 7/2006 | Maeda et al. | |
| 2007/0071206 A1* | 3/2007 | Gainsboro | H04M 3/2281 379/168 |
| 2007/0079331 A1* | 4/2007 | Datta | A63F 13/12 725/42 |
| 2007/0198267 A1* | 8/2007 | Jones | G06F 16/332 704/257 |
| 2007/0294229 A1 | 12/2007 | Au | |
| 2008/0031475 A1 | 2/2008 | Goldstein | |
| 2008/0147406 A1 | 6/2008 | Da Palma et al. | |
| 2008/0147407 A1 | 6/2008 | Da Palma et al. | |
| 2008/0275904 A1* | 11/2008 | Breebaart | G06F 16/634 |
| 2009/0150147 A1* | 6/2009 | Jacoby | G11B 27/105 704/235 |
| 2009/0300523 A1* | 12/2009 | Hwang | G06Q 30/06 715/762 |
| 2010/0312653 A1 | 12/2010 | Carpenter et al. | |
| 2010/0325299 A1* | 12/2010 | Rao | H04L 1/1854 709/230 |
| 2011/0054899 A1 | 3/2011 | Phillips et al. | |
| 2012/0041903 A1 | 2/2012 | Beilby et al. | |
| 2012/0253789 A1 | 10/2012 | Heck et al. | |
| 2012/0290299 A1* | 11/2012 | Basson | G10L 15/063 704/235 |
| 2013/0018963 A1* | 1/2013 | Brauff | G06Q 10/107 709/206 |
| 2013/0110978 A1 | 5/2013 | Gordon et al. | |
| 2013/0167196 A1* | 6/2013 | Spencer | H04W 8/22 726/3 |
| 2013/0275875 A1 | 10/2013 | Gruber et al. | |
| 2014/0120981 A1* | 5/2014 | King | H04N 1/00334 455/556.1 |
| 2014/0222436 A1 | 8/2014 | Binder et al. | |
| 2014/0244712 A1 | 8/2014 | Walters et al. | |
| 2014/0279050 A1 | 9/2014 | Makar et al. | |
| 2014/0279246 A1* | 9/2014 | Chen | G06Q 30/0623 705/26.61 |
| 2015/0019444 A1* | 1/2015 | Purves | G06Q 20/382 705/76 |
| 2015/0341499 A1 | 11/2015 | Korsei et al. | |
| 2016/0226522 A1* | 8/2016 | Resch | H04L 67/1097 |
| 2016/0259767 A1* | 9/2016 | Gelfenbeyn | G06F 8/20 |
| 2016/0313906 A1 | 10/2016 | Kilchenko et al. | |
| 2016/0349935 A1* | 12/2016 | Gelfenbeyn | G06Q 30/0601 |
| 2016/0350101 A1* | 12/2016 | Gelfenbeyn | H04L 63/102 |
| 2016/0378747 A1* | 12/2016 | Orr | G06F 3/167 704/9 |
| 2017/0048170 A1 | 2/2017 | Smullen et al. | |
| 2017/0069315 A1* | 3/2017 | Chung | G10L 15/22 |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0180284 A1* | 6/2017 | Smullen | H04L 67/322 |
| 2017/0250930 A1 | 8/2017 | Ben-Itzhak | |
| 2017/0279906 A1* | 9/2017 | Laird-McConnell | H04L 67/10 |
| 2017/0353404 A1* | 12/2017 | Hodge | H04L 51/02 |
| 2017/0358301 A1 | 12/2017 | Raitio et al. | |
| 2018/0054639 A1 | 2/2018 | Rosqvist | |
| 2018/0061400 A1 | 3/2018 | Carbune et al. | |
| 2018/0090137 A1 | 3/2018 | Horling et al. | |
| 2018/0121808 A1 | 5/2018 | Ramakrishna et al. | |
| 2018/0133900 A1 | 5/2018 | Breazeal et al. | |
| 2018/0167201 A1 | 6/2018 | Naqvi | |
| 2018/0241846 A1* | 8/2018 | Narayanan | H04L 67/34 |
| 2018/0267950 A1 | 9/2018 | De Mello Brandao et al. | |
| 2018/0288208 A1 | 10/2018 | Lee et al. | |
| 2018/0321989 A1 | 11/2018 | Shetty et al. | |
| 2018/0331980 A1 | 11/2018 | Jernstrom | |
| 2018/0332167 A1 | 11/2018 | Lu et al. | |
| 2018/0357286 A1* | 12/2018 | Wang | G06F 17/2785 |

FOREIGN PATENT DOCUMENTS

| | | | | |
|---|---|---|---|---|
| EP | 2955643 A1 * | 12/2015 | | G06F 17/30424 |
| GB | 2 555 922 | 5/2018 | | |
| JP | 2016-045584 A | 4/2016 | | |
| WO | WO-2006/129967 | 12/2006 | | |

OTHER PUBLICATIONS

Merriam-Webster, "dialogue", 2019 (Year: 2019).*
Wikipedia, "Optical character recognition", 2019 (Year: 2019).*
Wikipedia, "Chatbot", 2019 (Year: 2019).*
Buckland et al., "Amazon's Alexa Takes Open-Source Route to Beat Google Into Cars", Bloomberg, Feb. 27, 2018, 6 pages.
International Search Report and Written Opinion for App. Ser. No. PCT/US2017/037025 dated Mar. 19, 2018, 16 pages.
UK Office Action for App. Ser. No. GB1721440.4 dated Jun. 18, 2018, 8 pages.
UK Office Action for App. Ser. No. GB1721474.3 dated Jun. 18, 2018, 7 pages.
UK Search Report for Appl. Ser. No. GB1721456.0 dated Jul. 18, 2018, 4 pages.
Combined Search and Examination Report on UK Patent Application No. 1721486.7 (dated Jun. 18, 2018) 8 pages.
Non-Final Office Action on U.S. Appl. No. 15/618,854 dated Jan. 2, 2019.
Non-Final Office Action on U.S. Appl. No. 15/618,873 dated Apr. 17, 2019.
U.S. Office Action for U.S. Appl. No. 15/618,854 dated Jun. 13, 2019 (52 pages).
Notice of Allowance for U.S. Appl. No. 15/618,854 dated Nov. 29, 2019 (12 pages).
Notice of Allowance for U.S. Appl. No. 15/618,871 dated Dec. 11, 2019 (13 pages).
International Preliminary Report on Patentability and Written Opinion of the International Searching Authority for PCT Appln. Ser. No. PCT/US2017/037025 dated Dec. 19, 2019 (10 pages).
Cava1 in et al., A Hybrid Architecture for Multi-Party Conversational Systems, I BM, May 2017 (40 pages).
Final Office Action on U.S. Appl. No. 15/618,873 dated Aug. 9, 2019 (7 pages).
Harkous et al., PriBots: Conversational Privacy with Chatbots, (SOU PS) 2016, Jun. 22-24, 2016 (6 pages).
Non-Final Office Action on U.S. Appl. No. 15/618,871 dated Aug. 7, 2019 (44 pages).
Notice of Allowance on U.S. Appl. No. 15/618,873 dated Oct. 17, 2019.
Sathyenara et al., Helping Users Understand Privacy Notices with Automated Query Answering Functionality: An Exploratory Study, Carnegie Mellon, 2017 (22 pages).
"How do I Create Sponsored Messages in Messenger?", 3 pages.
"Walmart and Google to offer voice-enabled shopping", BBC News, Aug. 23, 2017 (10 pages).
Abrams, Help users find, interact & re-engage with your app on the Google Assistant, Google Developers Blog, Nov. 15, 2017, 16 pages.

(56) References Cited

OTHER PUBLICATIONS

Addybot "Chatbot Advertising Platform" 5 pages.
Albrecht, "Alexa, How Can You Be Used in Restaurants?", the spoon, Dec. 10, 2017, 6 pages.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Baesler, Christian "Lunch Bot, Anyone? How Brands Can use Chatbots in Advertising" Published on Jul. 22, 2016, 10 pages.
Barr, "AWS DeepLens—Get Hands-On Experience with Deep Learning With Our New Video Camera", AWS News Blog, Nov. 29, 2017, 11 pages.
Broussard, Mitchel, "Chatbot-Like Siri Patent Includes Intelligent Image, Video, and Audio Recognition Within Messages", May 11, 2017, 11 pages.
Chandler, Simon "Chatbots are the Future of Advertising" 8 pages.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time.com (2 pages).
Clover, Juli, "Amazon and Google Want to Turn Their Smart Home Speakers Into Telephone Replacements", MacRumors, Feb. 15, 2017 (5 pages).
Coberly, "Apple patent filing reveals potential whispering Siri functionality", Techspot, Dec. 14, 2017, 4 pages.
Collins, et al., "Can Twitter Save Itself?", cnet, Apr. 26, 2017, reprinted from https://www.cnet.com/news/twitter-q1-2017-earnings/ on Aug. 22, 2017 (2 pages).
Constine, Josh "Facebook Starts Allowing 'Sponsored Messages' ads", Apr. 12, 2016, 7 pages.
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Estes, "Amazon's Newest Gadget is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", CNET, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad is Trying to Control Your Google Home Device", Huffpost, Apr. 12, 2017 (7 pages).
Google Developers Newsletter "Google Assistant SDK", developers.google.com, retrieved on Jul. 12, 2017, 2 pages.
Google Inc., Products Feed Specification, printed from Internet address: http://www.supportgoogle.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Guardian, The, "You Facebook Messenger app is about to be filled with ads," reprinted from https://www.theguardian.com/technology/2017/jul/12/facebook-messenger-app-adverts on Aug. 21, 2017.
Gurman, Mark and Webb, Alex, "Apple is Manufacturing a Siri Speaker to Outdo Google and Amazon", Bloomberg, May 31, 2017, 3 pages.
Hardwick, Tim, "Facebook Smart Speaker Coming Next Year With 15-inch Touch Panel", MacRumors, Jul. 25, 2017 (5 pages).
Heater, "Amazon Alexa devices can finally tell voices apart", TechCrunch, Oct. 11, 2017, 6 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Kelion, Leo, "Amazon's race to make Alexa smarter", BBC News, Jul. 28, 2017 (8 pages).
Klimontovich, Vladimir, Bot Influencers are The Programmatic Future of Conversational Advertising:, Jul. 21, 2016, 13 pages.
Koetsier, John, "Ads on Amazon Echo: Wendy's, ESPN, and Progressive Among Brands Testing", Forbes, May 11, 2017, 3 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Larson, Selena, "Google Home now recognizes your individual voice", CNN Money, San Francisco, California, Apr. 20, 2017 (3 pages).
Lee, "Take Two for Samsung's troubled Bixby assistant", BBC News, Oct. 19, 2017, 6 pages.
Lee, Dave, "The five big announcements from Google I/O", BBC, May 18, 2017, 11 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Neff, Jack "What a Chatbot Can Teach you About Hair", published on Mar. 10, 2017, 8 pages.
Nieva, Richard, "Google Home and eBay can tell you how much that's worth", cnet, Mar. 8, 2017 (3 pages).
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
Perez, "Alexa's 'Routines' will combine smart home control with other actions, like delivering your news and weather", TechCrunch, Sep. 28, 2017, 10 pages.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Pringle, "'I'm sorry to hear that': Why training Siri to be a therapist won't be easy", CBC News, Sep. 24, 2017, 3 pages.
Purcher, Jack, Today Google Home's Virtual Assistant can learn its Owner's voice for Security Reasons like Apple's Patent Pending Idea, Apr. 20, 2017, 4 pages.
Sablich, Justin, "Planning a Trip With the Help of Google Home", New York Times, dated May 31, 2017, 6 pages.
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).

(56) References Cited

OTHER PUBLICATIONS

Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Unknown Author, "'Dolphin' attacks fool Amazon, Google voice assistants", BBC News, Sep. 7, 2017, 8 pages.
Willens, Max, "For publishers, Amazon Alexa holds promise but not much money (yet)", Digiday, Jul. 6, 2017, 5 pages.

\* cited by examiner

MODIFICATION OF AUDIO-BASED COMPUTER PROGRAM OUTPUT

BACKGROUND

Excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices.

SUMMARY

The present disclosure is generally directed to improving the efficiency and effectiveness of information transmission and processing over disparate computing resources. It is challenging for disparate computing resource to efficiently process, and consistently and accurately provide audio-based content items in a voice-based (or other non-text based such as image or video) computing environment. For example, the disparate computing resources may not have access to the same voice or image models, or may have access to out of date or unsynchronized voice or image models that can make it challenging to accurately and consistently provide the audio-based content item. Further, the computing resources may perform redundant processing to select content items that can be reused, thereby reducing processor utilization.

Systems and methods of the present disclosure are generally directed to a data processing system that modifies computing program output via a network. The data processing system can receive a request for content that is to be provided via a computing program comprising a chatbot. A chatbot, or artificial conversational entity, can refer to a computer program that conducts a conversation via auditory, visual, or textual techniques.

At least one aspect is directed to a system to modify computer program output. The system can include a data processing system comprising one or more processors and memory. The data processing system can receive, from a computing device, a digital file corresponding to a first acoustic signal carrying voice content detected by a microphone of the computing device. The first acoustic signal can be converted to the digital file by an analog to digital converter of the computing device. The data processing system can select, responsive to the voice content of the digital file, a computer program comprising a chatbot from a plurality of computer programs comprising chatbots for execution. The data processing system can identify, via the chatbot based on the voice content of the digital file, a dialog data structure comprising a placeholder field. The data processing system can generate, responsive to identification of the placeholder field in the dialog data structure, a request for content in a parameterized format configured for a parametrically driven text to speech technique. The data processing system can transmit the request for the content to a content selection component of the data processing system. The data processing system can select, via a content selection process responsive to the request, a content item for insertion into the placeholder field of the dialog data structure. The content item can be in the parameterized format configured for the parametrically driven text to speech technique. The data processing system can provide, to the chatbot, the content item in the parameterized format selected via the content selection process to cause the computing device to perform the parametrically driven text to speech technique to generate a second acoustic signal corresponding to the dialog data structure modified with the content item.

At least one aspect is directed to a method of modifying computer program output. The method can be performed by a data processing system comprising one or more processors and memory. The method can include the data processing system receiving, from a computing device, a digital file corresponding to a first acoustic signal carrying voice content detected by a microphone of the computing device. The first acoustic signal can be converted to the digital file by an analog to digital converter of the computing device. The method can include the data processing system selecting, responsive to the voice content of the digital file, a computer program comprising a chatbot from a plurality of computer programs comprising chatbots for execution. The method can include the data processing system identify, via the chatbot based on the voice content of the digital file, a dialog data structure comprising a placeholder field. The method can include the data processing system generating, responsive to identification of the placeholder field in the dialog data structure, a request for content in a parameterized format configured for a parametrically driven text to speech technique. The method can include the data processing system transmitting the request for the content to a content selection component of the data processing system. The method can include the data processing system selecting, via a content selection process responsive to the request, a content item for insertion into the placeholder field of the dialog data structure. The content item can be in the parameterized format configured for the parametrically driven text to speech technique. The method can include the data processing system providing, to the chatbot, the content item in the parameterized format selected via the content selection process to cause the computing device to perform the parametrically driven text to speech technique to generate a second acoustic signal corresponding to the dialog data structure modified with the content item.

At least one aspect is directed to a method of modifying computer program output. The method can include a sensor of a computing device detecting a first image comprising visual content. The method can include the computing converting the first image to a digital file corresponding to the visual content. The method can include selecting, responsive to the visual content of the digital file, a computer program comprising a chatbot from a plurality of computer programs comprising chatbots for execution. The method can include identifying, by the chatbot based on the visual content of the digital file, a dialog data structure comprising a placeholder field. The method can include generating, responsive to identifying the placeholder field in the dialog data structure, a request for content in a parameterized format configured for a parametrically driven text to speech technique. The method can include transmitting, by the chatbot, the request for the content to a content selection server. The method can include selecting, by the content selection server responsive to the request, a content item for insertion into the placeholder field of the dialog data structure, the content item in the parameterized format configured for the parametrically driven text to speech technique. The method can include providing, to the chatbot, the content item in the parameterized format selected via the content selection process to cause the computing device to perform the parametrically driven text to speech technique to generate an acoustic signal corresponding to the dialog data structure modified with the content item.

At least one aspect is directed to a system to balance data requests for modification of computer program output. The system can include a data processing system comprising one or more processors and memory. The data processing system can receive, from a computing device, a first digital file corresponding to a first acoustic signal with first voice content detected by a microphone of the computing device. The first acoustic signal converted to the first digital file by an analog to digital converter of the computing device. The data processing system can select, responsive to the first voice content of the first digital file, a computer program comprising a chatbot from a plurality of computer programs comprising chatbots for execution. The data processing system can identify, via the chatbot based on the first voice content of the first digital file, a first dialog data structure comprising a placeholder field. The data processing system can select, via a content selection process responsive to identification of the first placeholder field in the first dialog data structure, a content item for insertion into the first placeholder field of the first dialog data structure. The content item can be in a parameterized format configured for a parametrically driven text to speech technique. The data processing system can provide, to the chatbot, the content item in the parameterized format selected via the content selection process to cause the computing device to perform the parametrically driven text to speech technique to generate a second acoustic signal corresponding to the first dialog data structure modified with the content item. The data processing system can generate an index value based on a first identifier of the chatbot, a second identifier for the first dialog data structure, and a third identifier for the computing device. The data processing system can associate, in the memory, the content item with the index value. The data processing system can receive a second digital file corresponding to a third acoustic signal carrying second voice content detected by the microphone on the computing device. The data processing system can select, responsive to the second voice content of the second digital file, the computer program comprising the chatbot. The data processing system can identify, via the chatbot based on the second voice content of the second digital file, a second dialog data structure comprising a second placeholder field. The data processing system can select, responsive to identification of the second placeholder and based on the first identifier of the chatbot, the third identifier of the computing device, and a fourth identifier of the second dialog data structure, the content item associated with the index value. The data processing system can provide, to the chatbot, the content item associated with the index value to cause the computing device to perform the parametrically driven text to speech technique to generate a fourth acoustic signal corresponding to the second dialog data structure modified with the content item.

At least one aspect is directed to a method of balancing data requests for modification of computer program output. The method can be performed by a data processing system comprising one or more processors and memory. The method can include the data processing system receiving, from a computing device, a first digital file corresponding to a first acoustic signal with first voice content detected by a microphone of the computing device. The first acoustic signal can be converted to the first digital file by an analog to digital converter of the computing device. The method can include the data processing system selecting, responsive to the first voice content of the first digital file, a computer program comprising a chatbot from a plurality of computer programs comprising chatbots for execution. The method can include the data processing system identifying, via the chatbot based on the first voice content of the first digital file, a first dialog data structure comprising a placeholder field. The method can include the data processing system selecting, via a content selection process responsive to identification of the first placeholder field in the first dialog data structure, a content item for insertion into the first placeholder field of the first dialog data structure. The content item can be in a parameterized format configured for a parametrically driven text to speech technique. The method can include the data processing system providing, to the chatbot, the content item in the parameterized format selected via the content selection process to cause the computing device to perform the parametrically driven text to speech technique to generate a second acoustic signal corresponding to the first dialog data structure modified with the content item. The method can include the data processing system generating an index value based on a first identifier of the chatbot, a second identifier for the first dialog data structure, and a third identifier for the computing device. The method can include the data processing system associating, in the memory, the content item with the index value. The method can include the data processing system receiving a second digital file corresponding to a third acoustic signal carrying second voice content detected by the microphone on the computing device. The method can include the data processing system selecting, responsive to the second voice content of the second digital file, the computer program comprising the chatbot. The method can include the data processing system identifying, via the chatbot based on the second voice content of the second digital file, a second dialog data structure comprising a second placeholder field. The method can include the data processing system selecting, responsive to identification of the second placeholder and based on the first identifier of the chatbot, the third identifier of the computing device, and a fourth identifier of the second dialog data structure, the content item associated with the index value. The method can include the data processing system providing, to the chatbot, the content item associated with the index value to cause the computing device to perform the parametrically driven text to speech technique to generate a fourth acoustic signal corresponding to the second dialog data structure modified with the content item.

At least one aspect is directed to a system to balance data requests for modification of computer program output. The system can include a data processing system comprising one or more processors and memory. The data processing system can receive, from a computing device, a first digital file corresponding to a first acoustic signal with first voice content detected by a microphone of the computing device. The first acoustic signal can be converted to the first digital file by an analog to digital converter of the computing device. The data processing system can select, responsive to the first voice content of the first digital file, a computer program comprising a first chatbot from a plurality of computer programs comprising chatbots for execution. The data processing system can identify, via the first chatbot based on the first voice content of the first digital file, a first dialog data structure comprising a placeholder field. The data processing system can select, via a content selection process responsive to identification of the first placeholder field in the first dialog data structure, a content item for insertion into the first placeholder field of the first dialog data structure. The content item can be in a parameterized format configured for a parametrically driven text to speech technique. The data processing system can provide, to the computing device, the first dialog data structure modified with the content item in the parameterized format selected via the content selection process to cause the computing device to perform the parametrically driven text to speech technique to generate a second acoustic signal corresponding to the first dialog data structure modified with the content item. The data processing system can generate an index value based on a first identifier for the first placeholder field and a second identifier for the computing device. The data processing system can associate, in the memory, the content item with the index value. The data processing system can receive a second digital file corresponding to a third acoustic signal carrying second voice content detected by the microphone on the computing device. The data processing system can select, responsive to the second voice content of the second digital file, a second computer program comprising a second chatbot from the plurality of computer programs, the second chatbot different from the first chatbot. The data processing system can identify, via the second chatbot based on the second voice content of the second digital file, a second dialog data structure comprising a second placeholder field. The data processing system can select, responsive to identification of the second placeholder and based on the first identifier of the first placeholder field and the second identifier of the computing device, the content item associated with the index value. The data processing system can provide, to the computing device, the second dialog data structure modified with the content item associated with the index value to cause the computing device to perform the parametrically driven text to speech technique to generate a fourth acoustic signal corresponding to the second dialog data structure modified with the content item.

At least one aspect is directed to a method of balancing data requests for modification of computer program output. The method can be performed by a data processing system comprising one or more processors and memory. The method can include the data processing system receiving, from a computing device, a first digital file corresponding to a first acoustic signal with first voice content detected by a microphone of the computing device. The first acoustic signal can be converted to the first digital file by an analog to digital converter of the computing device. The method can include the data processing system selecting, responsive to the first voice content of the first digital file, a computer program comprising a first chatbot from a plurality of computer programs comprising chatbots for execution. The method can include the data processing system identifying, via the first chatbot based on the first voice content of the first digital file, a first dialog data structure comprising a placeholder field. The method can include the data processing system selecting, via a content selection process responsive to identification of the first placeholder field in the first dialog data structure, a content item for insertion into the first placeholder field of the first dialog data structure. The content item can be in a parameterized format configured for a parametrically driven text to speech technique. The method can include the data processing system providing, to the computing device, the first dialog data structure modified with the content item in the parameterized format selected via the content selection process to cause the computing device to perform the parametrically driven text to speech technique to generate a second acoustic signal corresponding to the first dialog data structure modified with the content item. The method can include the data processing system generating an index value based on a first identifier for the first placeholder field and a second identifier for the computing device. The method can include the data processing system associating, in the memory, the content item with the index value. The method can include the data processing system receiving a second digital file corresponding to a third acoustic signal carrying second voice content detected by the microphone on the computing device. The method can include the data processing system selecting, responsive to the second voice content of the second digital file, a second computer program comprising a second chatbot from the plurality of computer programs, the second chatbot different from the first chatbot. The method can include the data processing system identifying, via the second chatbot based on the second voice content of the second digital file, a second dialog data structure comprising a second placeholder field. The method can include the data processing system selecting, responsive to identification of the second placeholder and based on the first identifier of the first placeholder field and the second identifier of the computing device, the content item associated with the index value. The method can include the data processing system providing, to the computing device, the second dialog data structure modified with the content item associated with the index value to cause the computing device to perform the parametrically driven text to speech technique to generate a fourth acoustic signal corresponding to the second dialog data structure modified with the content item.

At least one aspect is directed to a system to validate modification of computer program output. The system can include a data processing system comprising one or more processors and memory. The data processing system can establish a communication channel with a third-party server that provides a computer program comprising a chatbot. The computer program can include the chatbot selected based on an acoustic signal detected by a microphone of a computing device. The data processing system can receive, from the third-party server, a request for content in a parameterized format configured for a parametrically driven text to speech technique. The request can be triggered by identification of a placeholder field in a dialog data structure identified by the chatbot. The data processing system can select, via a content selection process responsive to the request, a content item for insertion into the placeholder field of the dialog data structure. The content item can be in the parameterized format configured for the parametrically driven text to speech technique. The data processing system can transmit, to the third-party server, the content item in the parameterized format selected via the content selection process for provision to the chatbot to cause the computing device to perform the parametrically driven text to speech technique to generate a second acoustic signal corresponding to the dialog data structure modified with the content item. The data processing system can receive, from the chatbot, an indication of the content item. The data processing system can set, based on a comparison of the indication of the content item with the content item, a validation parameter for the third-party server.

At least one aspect is directed to a method of validating modification of computer program output. The method can be performed by a data processing system comprising one or more processors and memory. The method can include the data processing system establishing a communication channel with a third-party server that provides a computer program comprising a chatbot. The computer program can include the chatbot selected based on an acoustic signal detected by a microphone of a computing device. The method can include the data processing system receiving, from the third-party server, a request for content in a parameterized format configured for a parametrically driven text to speech technique. The request can be triggered by identification of a placeholder field in a dialog data structure identified by the chatbot. The method can include the data processing system selecting, via a content selection process responsive to the request, a content item for insertion into the placeholder field of the dialog data structure. The content item can be in the parameterized format configured for the parametrically driven text to speech technique. The method can include the data processing system transmitting, to the third-party server, the content item in the parameterized format selected via the content selection process for provision to the chatbot to cause the computing device to perform the parametrically driven text to speech technique to generate a second acoustic signal corresponding to the dialog data structure modified with the content item. The method can include the data processing system receiving, from the chatbot, an indication of the content item. The method can include the data processing system setting, based on a comparison of the indication of the content item with the content item, a validation parameter for the third-party server.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
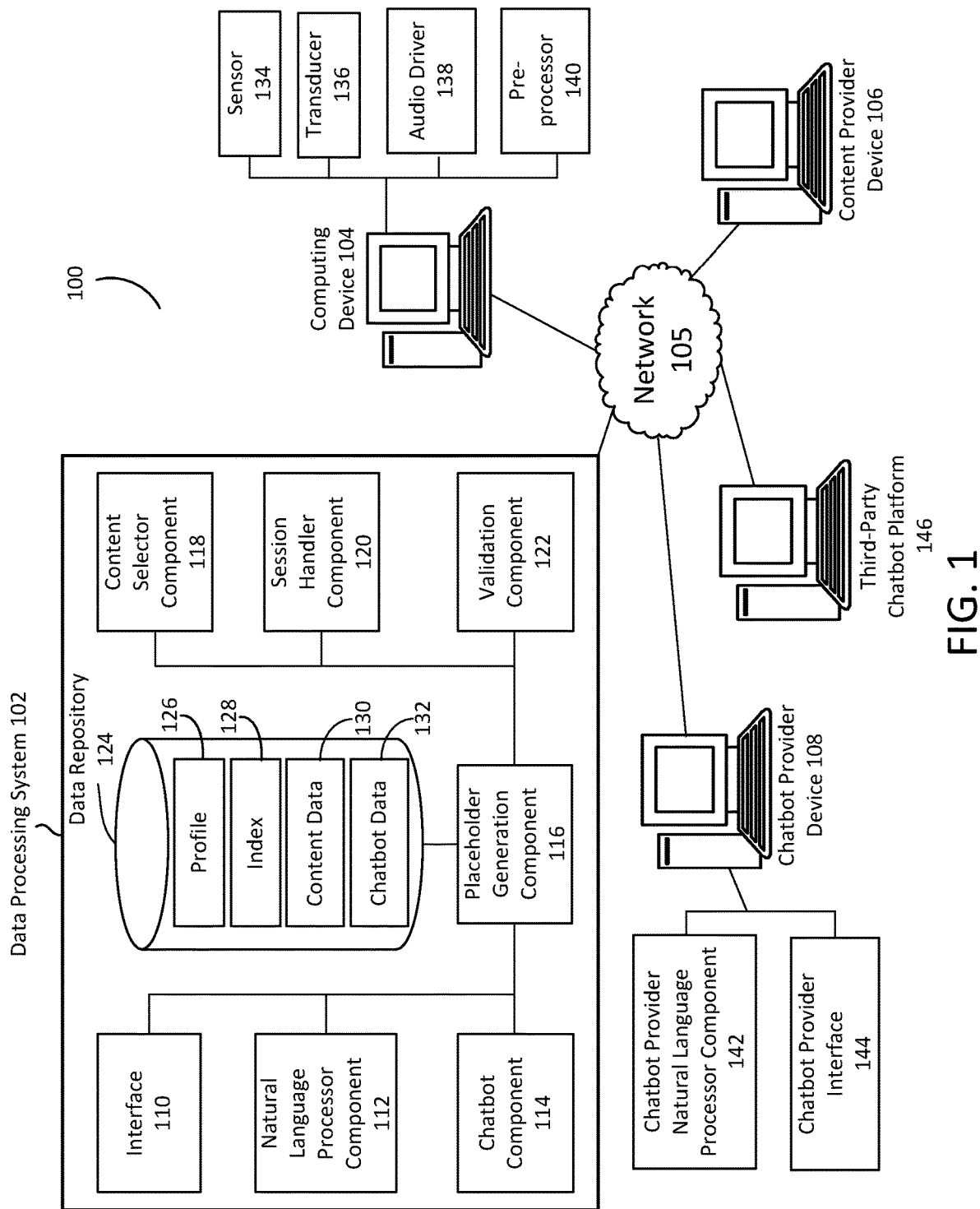
FIG. 1 is an illustration of a system to modify computer program output via a network.

Following below are more detailed descriptions of various concepts related to, and implementations of, methods, apparatuses, and systems of routing packetized actions via a computer network. The various concepts introduced above and discussed in greater detail below may be implemented in any of numerous ways.

The present disclosure is generally directed to improving the efficiency and effectiveness of information transmission and processing over disparate computing resources. It is challenging for disparate computing resources to efficiently process, and consistently and accurately provide audio-based content items in a voice-based computing environment. For example, the disparate computing resources may not have access to the same voice models, or may have access to out of date or unsynchronized voice models that can make it challenging to accurately and consistently provide the audio-based content item. Further, the computing resources may perform redundant processing to select content items that can be reused, thereby reducing processor utilization and wasting processing resources and electrical power.

Systems and methods of the present disclosure are generally directed to a data processing system that modifies computing program output via a network. The data processing system can receive a request for content that is to be provided via a computing program comprising a chatbot. A chatbot, or artificial conversational entity, can refer to a computer program that conducts a conversation via auditory, visual, or textual techniques.

The present solution can reduce resource consumption, processor utilization, battery consumption, bandwidth utilization, size of an audio file, or amount of time consumed by a speaker by parsing voice-based instructions from an end user, selecting or reusing a parameterized content item, and routing the parameterized content item with a dialog data structure.

For example, the present solution can provide automated native content items for chatbots through dynamic digital product placement. The solution can provide a configuration of an application programming interface that allows for the chatbot to initiate or request a content selection process, as well as insert the selected content item in a dialog data structure. For example, the chatbot can be a recipe chatbot. The recipe chatbot can provide a list of ingredients, for example, in the native voice. The present solution can identify placeholder in the ingredient list, select a content item via a content selection process for the placeholder, and provide the content item for insertion in the placeholder. The content selection process can occur in real-time, for example after the chatbot has launched or been executed and prior to playing the portion of the dialog data structure having the placeholder. The system can perform the content selection process in close proximity to when the placeholder would be rendered. Further, the application programming interface can use a parametrically driven text to speech technique to provide content items using a native voice.

The present solution can merge, resume, or re-establish sessions in order to reduce data processing. For example, the technology can determine that a session is to be resumed, and use a content item selected in a previous session for provision in a second dialog data structure after a break in the session. For example, the recipe chatbot can provide the list of ingredients and insert a brand name for an ingredient that is selected via a content selection process. The system can then detect a break in the session. The system can detect the break based on, for example, the user going to the store to purchase the ingredients. When the user returns home, the recipe chatbot can re-establish the session and use the previously selected brand name as opposed to a different brand name for the same ingredients. By using the same brand name, the system is more efficient because the system avoids performing the significant processing associated with performing a content selection process.

The system can resume sessions with the same chatbot, or straddle a session across multiple chatbots. The system can aggregate data among multiple chatbots or interface between multiple chatbots in order to reduce processor utilization by avoiding or reducing the amount of redundant processing. For example, the recipe chatbot can identify a brand name soda. Thereafter, a computing device can invoke a movie chatbot. The movie chatbot can poll or query the recipe chatbot for the brand name of the soda, and the movie chatbot, using the same native voice, or a different native voice as compared to the recipe chatbot, can insert the same brand name of the soda.

The system can validate a chatbot platform using a validation technique. For example, the data processing system can provide a content item to a third-party chatbot server with instructions to forward the content item to the chatbot for insertion in a dialog data structure. The data processing system can then ping the chatbot for the content item, and compare the response from the chatbot with the content item that was initially provided to the third-party chatbot platform to determine whether they match, or if the third-party chatbot platform modified the content item.

FIG. 1 illustrates an example system 100 to modify computer program output via a computer network. The system 100 can include content selection infrastructure. The system 100 can include a data processing system 102. The data processing system 102 can communicate with one or more of a content provider computing device 106, chatbot provider device 108, third-party chatbot platform server 146, or client computing device 104 via a network 105. The network 105 can include computer networks such as the Internet, local, wide, metro, or other area networks, intranets, satellite networks, and other communication networks such as voice or data mobile telephone networks. The network 105 can be used to access information resources such as web pages, web sites, domain names, or uniform resource locators that can be presented, output, rendered, or displayed on at least one computing device 104, such as a laptop, desktop, tablet, personal digital assistant, smart phone, portable computers, or speaker. For example, via the network 105 a user of the computing device 104 can access information or data provided by a chatbot provider 108 or content provider computing device 106. The computing device 104 may or may not include a display; for example, the computing device may include limited types of user interfaces, such as a microphone and speaker. In some cases, the primary user interface of the computing device 104 may be a microphone and speaker.

The network 105 can include or constitute a display network, e.g., a subset of information resources available on the internet that are associated with a content placement or search engine results system, or that are eligible to include third party content items as part of a content item placement campaign. The network 105 can be used by the data processing system 102 to access information resources such as web pages, web sites, domain names, or uniform resource locators that can be presented, output, rendered, or displayed by the client computing device 104. For example, via the network 105 a user of the client computing device 104 can access information or data provided by the content provider computing device 106 or the chatbot provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 105, for example with the computing device 104, the content provider device 106 (content provider computing device 106), or the chatbot provider device 108 (or chatbot provider 108). The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one chatbot provider device 108. The chatbot provider device 108 can include at least one logic device such as a computing device having a processor to communicate via the network 105, for example with the computing device 104, the data processing system 102, or the content provider computing device 106. The chatbot provider device 108 can include at least one computation resource, server, processor or memory. For example, chatbot provider device 108 can include a plurality of computation resources or servers located in at least one data center. The chatbot provider device 108 can include one or more component or functionality of the data processing system 102.

The chatbot provider device 108 can include or refer to a chatbot developer, such as an entity that designs, develops, manages, or maintains computer programs that form or provide one or more chatbots. A chatbot can include a computer program that conducts a conversation via auditory, image, or textual methods. The chatbot can be designed to simulate how a human would behave as a conversational partner. Chatbots can be used in dialog systems for customer service or information acquisition. Chatbots can include or use natural language processing systems (e.g., natural language processor component 112). The chatbot can scan for keywords within an input, and then pull a reply with the most matching keywords, or the most similar wording pattern, from a database. The chatbot can be programmed with procedures that utilize pattern-matching to lookup predefined dialog data structures. The chatbot can be programmed with natural language processing techniques to identify a grammar and syntax of input, tokenize input, or otherwise process the input to determine a response.

The content provider computing device 106 can provide audio based content items for display by the client computing device 104 as an audio output content item. The content item can be or include a digital component. The content item can be or include a digital object. The content item can include a brand name or company name of a good or service. The content item can be configured for a parametrically driven text to speech technique. The content item can be configured for text-to-speech (TTS) implementations that convert normal language text into speech. The content item can be input to an application programming interface that utilizes a speech-synthesis capability to synthesize text into natural-sounding speech in a variety of languages, accents, and voices. The content item can be coded as plain text or a speech synthesis markup language (SSML). SSML can include parameters that can be set to control aspects of speech, such as pronunciation, volume, pitch, or rate that can form an acoustic fingerprint or native voice.

For example, a chatbot can identify a dialog data structure such as "The Ingredients for Chicken Wings are: 1 cup brown sugar, 1 can <placeholder> cola, 2 medium onions, and 2 cloves garlic." The content provider computing device 106 can provide a content item to be inserted into the <placeholder> in the dialog data structure, such as a brand name of cola. The content provider computing device 106 can provide content selection criteria for the content item, such as a value, keyword, concept, or other metadata or information to facilitate a content selection process. The content provider computing device 106 can also provide audio based content items (or other content items) to the data processing system 102 where they can be stored in the data repository 124. The data processing system 102 can select the audio content items (or content items configured for a parametrically driven text, image, or video to speech technique) and provide (or instruct the content provider computing device 106 to provide) the audio content items to the client computing device 104. The audio based content items can be exclusively audio or can be combined with text, image, or video data.

The content provider computing device 106 can provide the content item to the data processing system 102 for storage in the data repository 124 in the content data data structure 130. The data processing system 102 can retrieve the content item responsive to a request for content or otherwise determining to provide the content item.

The chatbot provider device 108 can include, interface, or otherwise communicate with at least one chatbot provider natural language processor component 142 and a chatbot provider interface 144. The chatbot provider computing device 108 can include at least one chatbot provider natural language processor (NLP) component 142 and at least one chatbot provider interface 144. The chatbot provider NLP component 142 (or other components such of the chatbot provider computing device 108 or chatbot platform 146) can engage with the client computing device 104 (via the data processing system 102 or bypassing the data processing system 102) to create a back-and-forth real-time voice or audio based conversation (e.g., a session) between the client computing device 104 and the chatbot provider computing device 108. The chatbot provider NLP 142 can include one or more function or feature as the NLP component 112 of the data processing system 102. For example, the chatbot provider interface 144 can receive or provide data messages to the interface 110 of the data processing system 102. The chatbot provider computing device 108 and the content provider computing device 106 can be associated with the same entity. For example, the content provider computing device 106 can create, store, or make available content items for a chatbot, and the chatbot provider computing device 108 can establish a session with the client computing device 106 to communicate via a chatbot via the client computing device 104. The data processing system 102, via the interface 110, chatbot component 114, session handler component 120 or other components can also establish the session with the client computing device 104, including or bypassing the chatbot provider computing device 104 or the third-party chatbot platform 146.

The third-party chatbot platform 146 can refer to one or more servers of an entity that is different from the entity that administers or provides the data processing system 102. The third-party chatbot platform 146 can receive computer programs for a chatbot from the chatbot provider device 108. The third-party chatbot platform 146 can provide natural language processing and other functions. The third-party chatbot platform 146 can interface or communicate with the computing device 104 to provide the chatbot functionality. For example, third-party chatbot platform 146 can execute or run the chatbot provided by the chatbot provider device 108 in order to engage in a conversion with a user of the computing device 104. The third-party chatbot platform 146 can execute on a server remove from the data processing system 102 and computing device 104. In some cases, the third-party chatbot platform 146 can execute at least partially on the computing device 104 (e.g., as part of pre-processor 140).

The computing device 104 can include, interface, or otherwise communicate with at least one sensor 134, transducer 136, audio driver 138, or pre-processor 140. The sensor 134 can include, for example, a camera, an ambient light sensor, proximity sensor, temperature sensor, accelerometer, gyroscope, motion detector, GPS sensor, location sensor, microphone, video, image detection, or touch sensor. The transducer 136 can include or be part of a speaker or a microphone. The audio driver 138 can provide a software interface to the hardware transducer 136. The audio driver can execute the audio file or other instructions provided by the data processing system 102 to control the transducer 136 to generate a corresponding acoustic wave or sound wave. The pre-processor 140 can detect a keyword and perform an action based on the keyword. The pre-processor 140 can filter out one or more terms or modify the terms prior to transmitting the terms to the data processing system 102 for further processing. The pre-processor 140 can convert the analog audio signals detected by the microphone into a digital audio signal, and transmit one or more data packets carrying the digital audio signal to the data processing system 102 via the network 105. In some cases, the pre-processor 140 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 104 can be associated with an end user that enters voice queries as audio input into the client computing device 104 (via the sensor 134) and receives audio output in the form of a computer-generated voice that can be provided from the data processing system 102 (or the content provider computing device 106 or the chatbot provider computing device 108) to the client computing device 104, output from the transducer 136 (e.g., a speaker). The computer-generated voice can include recordings from a real person or computer generated language.

The client computing device 104 can be associated with an end user that provides image or video that can indicate queries as input into the client computing device 104 (via the sensor 134), and receives audio output in the form of a computer-generated voice that can be provided from the data processing system 102 (or the content provider computing device 106 or the chatbot provider computing device 108) to the client computing device 104, output from the transducer 136 (e.g., a speaker). The input detected by the one or more sensors 134 can include one or more of audio input (e.g., acoustic signal), visual input (e.g., image or video data), motion input or other input. The input (e.g., the one or more of audio, image, visual, or motion input) to the computing device 104 can be converted to a digital file and provided to the data processing system 102 for further processing or to generate actions. For example, the input (e.g., the one or more of audio, image, visual, or motion input) to the computing device 104 can trigger the selection of a computer program comprising a chatbot, trigger the generation of a query to be input to the chatbot, and the chatbot can provide output that is responsive to the query generated or corresponding to the input (e.g., the one or more of audio, image, visual, or motion input) to the computing device 104.

The data repository 124 can include one or more local or distributed databases, and can include a database management system. The data repository 124 can include computer data storage or memory and can store one or more profiles 126, one or more indexes 128, content data 130, or chatbot data 132 among other data. The profile 126 can include information about the computing device 104 or an account associated with the computing device 104. The profile 126 can include historical network activity associated with the computing device 104, identifiers of chatbots utilized by computing device 104, a configuration of the computing device 104, device functionality, preferences, or other information associated with the computing device 104 that can facilitate content selection. The index 128 can map previously selected content items to a session identifier, computing device identifier, dialog data structure identifier to facilitate reuse of the content item. The content data 130 can include content items for audio output or associated metadata, as well as input audio messages that can be part of one or more communication sessions with the client computing device 104. The chatbot data 132 can include identifiers for chatbots, information about types of chatbots (e.g., category, restrictions, or topics).

The data processing system 102 can include a content placement system having at least one computation resource or server. The data processing system 102 can include, interface, or otherwise communicate with at least one interface 110. The data processing system 102 can include, interface, or otherwise communicate with at least one natural language processor component 112. The data processing system 102 can include, interface, or otherwise communicate with at least one chatbot component 114. The data processing system 102 can include, interface, or otherwise communicate with at least one placeholder generation component 116. The data processing system 102 can include, interface, or otherwise communicate with at least one content selector component 118. The data processing system 102 can include, interface, or otherwise communicate with at least one session handler component 118. The data processing system 102 can include, interface, or otherwise communicate with at least one validation component 122. The data processing system 102 can include, interface, or otherwise communicate with at least one data repository 124. The at least one data repository 124 can include or store, in one or more data structures or databases, profiles 126, indexes 128, content data 130, or chatbot data 132. Content data 130 can include, for example, content campaign information, content groups, content selection criteria, content item objects or other information provided by a content provider computing device 106 or obtained or determined by the data processing system to facilitate content selection. The content data 130 can include, for example, historical performance of a content campaign.

The interface 110, natural language processor component 112, chatbot component 114, placeholder generation component 116, content selector component 118, session handler component 120, or validation component 122 can each include at least one processing unit or other logic device such as programmable logic array engine, or module configured to communicate with the database repository or database 124. The interface 110, natural language processor component 112, chatbot component 114, placeholder generation component 116, content selector component 118, session handler component 120, validation component 122 and data repository 124 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous and the computing device 104 can be associated with a unique identifier (e.g., a unique identifier for the user or the computing device provided by the data processing system or a user of the computing device). The data processing system can associate each observation with a corresponding unique identifier.

A content provider computing device 106 can establish an electronic content campaign. The electronic content campaign can be stored as content data 130 in data repository 124. An electronic content campaign can refer to one or more content groups that correspond to a common theme. A content campaign can include a hierarchical data structure that includes content groups, content item data objects (e.g., digital components or digital objects), and content selection criteria. To create a content campaign, content provider computing device 106 can specify values for campaign level parameters of the content campaign. The campaign level parameters can include, for example, a campaign name, a preferred content network for placing content item objects, a value of resources to be used for the content campaign, start and end dates for the content campaign, a duration for the content campaign, a schedule for content item object placements, language, geographical locations, type of computing devices on which to provide content item objects. In some cases, an impression can refer to when a content item object is fetched from its source (e.g., data processing system 102 or content provider computing device 106), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the content item object for display on the computing device 104. In some cases, an impression can refer to a viewable or audible impression; e.g., the content item object or digital component is at least partially (e.g., 20%, 30%, 30%, 40%, 50%, 60%, 70%, or more) viewable on a display device of the client computing device 104, or audible via a speaker 136 of the computing device 104. A click or selection can refer to a user interaction with the content item object, such as a voice response to an audible impression, a mouse-click, touch interaction, gesture, shake, audio interaction, or keyboard click. A conversion can refer to a user taking a desired action with respect to the content item objection; e.g., purchasing a product or service, completing a survey, visiting a physical store corresponding to the content item, or completing an electronic transaction.

The content provider computing device 106 can further establish one or more content groups for a content campaign. A content group includes one or more content item objects and corresponding content selection criteria, such as keywords, words, terms, phrases, geographic locations, type of computing device, time of day, interest, topic, or vertical. Content groups under the same content campaign can share the same campaign level parameters, but may have tailored specifications for content group level parameters, such as keywords, negative keywords (e.g., that block placement of the content item in the presence of the negative keyword on main content), bids for keywords, or parameters associated with the bid or content campaign.

To create a new content group, the content provider computing device 106 can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider computing device 106 can use to capture a topic or subject matter for which content item objects of the content group is to be selected for display. For example, a food and beverage company can create a different content group for each brand of food or beverage it carries, and may further create a different content group for each model of vehicle it carries. Examples of the content group themes that the food and beverage company can use include, for example, "Brand A cola", "Brand B ginger ale," "Brand C orange juice," "Brand D sports drink," or "Brand E purified water." An example content campaign theme can be "soda" and include content groups for both "Brand A cola" and "Brand B ginger ale", for example. The content item (or content item object or digital component) can include "Brand A", "Brand B", "Brand C", "Brand D" or "Brand E". The content item object or digital component can refer to the content item configured for a parametrically driven text to speech technique.

The content provider computing device 106 can provide one or more keywords and content item objects to each content group. Keywords can include terms that are relevant to the product or services of associated with or identified by the content item objects. A keyword can include one or more terms or phrases. For example, the food and beverage company can include "soda," "cola," "soft drink," as keywords for a content group or content campaign that can be descriptive of the goods or services the brand provides. In some cases, negative keywords can be specified by the content provider to avoid, prevent, block, or disable content placement on certain terms or keywords. The content provider can specify a type of matching, such as exact match, phrase match, or broad match, used to select content item objects.

The content provider computing device 106 can provide one or more keywords to be used by the data processing system 102 to select a content item object provided by the content provider computing device 106. The content provider computing device 106 can identify one or more keywords to bid on, and further provide bid amounts for various keywords. The content provider computing device 106 can provide additional content selection criteria to be used by the data processing system 102 to select content item objects. Multiple content providers 106 can bid on the same or different keywords, and the data processing system 102 can run a content selection process or ad auction responsive to receiving an indication of a keyword of an electronic message.

The content provider computing device 106 can provide one or more content item objects for selection by the data processing system 102. The data processing system 102 (e.g., via content selector component 118) can select the content item objects when a content placement opportunity becomes available that matches the resource allocation, content schedule, maximum bids, keywords, and other selection criteria specified for the content group. Different types of content item objects can be included in a content group, such as a voice content item, audio content item, a text content item, an image content item, video content item, multimedia content item, or content item link. Upon selecting a content item, the data processing system 102 can transmit the content item object for rendering on a computing device 104 or display device of the computing device 104. Rendering can include displaying the content item on a display device, or playing the content item via a speaker of the computing device 104. The data processing system 102 can provide instructions to a computing device 104 or chatbot component 114, or third-party chatbot platform 146 to present the content item object. The data processing system 102 can instruct the computing device 104, or an audio driver 138 of the computing device 104, to generate audio signals or acoustic waves.

The data processing system 102 can include an interface component 110 designed, configured, constructed, or operational to receive and transmit information using, for example, data packets. The interface 110 can receive and transmit information using one or more protocols, such as a network protocol. The interface 110 can include a hardware interface, software interface, wired interface, or wireless interface. The interface 110 can facilitate translating or formatting data from one format to another format. For example, the interface 110 can include an application programming interface that includes definitions for communicating between various components, such as software components.

The data processing system 102 can include an application, script or program installed at the client computing device 104, such as an application to communicate input audio signals to the interface 110 of the data processing system 102 and to drive components of the client computing device to render output audio signals. The data processing system 102 can receive data packets, a digital file, or other signal that includes or identifies an audio input signal. The computing device 104 can detect the audio signal via the transducer 136, and convert the analog audio signal to a digital file via an analog-to-digital converter. For example, the audio driver 138 can include an analog-to-digital converter component.

The data processing system 102 can execute or run the NLP component 112 to receive or obtain the digital file comprising the audio signal and parse the audio signal. For example, the NLP component 112 can provide for interactions between a human and a computer. The NLP component 112 can be configured with techniques for understanding natural language and allowing the data processing system 102 to derive meaning from human or natural language input. The NLP component 112 can include or be configured with technique based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in data repository 124 or other database accessible to the data processing system 102. The representative waveforms are generated across a large set of users, and then may be augmented with speech samples from the user. After the audio signal is converted into recognized text, the NLP component 112 matches the text to words that are associated, for example via training across users or through manual specification, with actions that the data processing system 102 can serve. The NLP component 112 can convert image or video input to text or digital files. The NLP component 112 can process, analyze or interpret image or video input to perform actions, generate requests, or select or identify data structures.

The audio input signal can be detected by the sensor 134 or transducer 136 (e.g., a microphone) of the client computing device 104. Via the transducer 136, the audio driver 138, or other components the client computing device 104 can provide the audio input signal to the data processing system 102 (e.g., via the network 105) where it can be received (e.g., by the interface 110) as a digital file or digital format and provided to the NLP component 112 or stored in the data repository 124. In some cases, the data processing system 102 can receive image or video input signals, in addition to, or instead of, input acoustic signals. The data processing system 102 can process the image or video input signals using, for example, image interpretation techniques, computer vision, a machine learning engine, or other techniques to recognize or interpret the image or video to convert the image or video to a digital file. The one or more image interpretation techniques, computer vision techniques, machine learning techniques can be collectively referred to as imaging techniques. The data processing system 102 (e.g., the NLP component 112) can be configured with the imaging techniques, in addition to, or instead of, audio processing techniques.

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request and the trigger keyword. For instance, the NLP component 112 can apply a semantic processing technique to the input audio signal to identify the trigger keyword or the request. The NLP component 112 can apply the semantic processing technique to the input audio signal to identify a trigger phrase that includes one or more trigger keywords, such as a first trigger keyword and a second trigger keyword. For example, the input audio signal can include the sentence "I need a recipe for chicken wings." The NLP component 112 can apply a semantic processing technique, or other natural language processing technique, to the data packets comprising the sentence to identify trigger phrases "need" "recipe" and "chicken wings". The NLP component 112 can further identify multiple trigger keywords, such as need, recipe, and chicken wings. For example, the NLP component 112 can determine that the trigger phrase includes the trigger keyword and a second trigger keyword.

The NLP component 112 can filter the input audio signal to identify the trigger keyword. For example, the data packets carrying the input audio signal can include "It would be great if I could get help with a recipe for chicken wings", in which case the NLP component 112 can filter out one or more terms as follows: "it", "would", "be", "great", "if", "I", "could", "get", or "help". By filtering out these terms, the NLP component 112 may more accurately and reliably identify the trigger keywords, such as "recipe for chicken wings" and determine that this is a request to launch a recipe chatbot.

In some cases, the NLP component can determine that the data packets carrying the input audio signal includes one or more requests. For example, the input audio signal can include the sentence "I need some help with making chicken wings and movie show times." The NLP component 112 can determine this is a request for a recipe for chicken wings and movie show times. The NLP component 112 can determine this is a single request for a chatbot that can provide both recipes and movie times. The NLP component 112 can determine that this is two requests; a first request for a chatbot that provides recipes, and a second request for a chatbot that provides movie times. In some cases, the NLP component 112 can combine the multiple determined requests into a single request, and transmit the single request to a chatbot component 114 or third-party chatbot platform 146. In some cases, the NLP component 112 can transmit the individual requests to respective chatbot provider devices 108, or separately transmit both requests to the same chatbot provider device 108.

Thus, the data processing system 102 can receive a digital file corresponding to a first acoustic signal carrying voice content detected by a transducer 136 of the computing device 104. The first acoustic signal can be converted to the digital file by an analog to digital converter (e.g., audio driver 138) of the computing device 104. The data processing system 102 can parse the digital file to select a computer program comprising a chatbot. For example, the data processing system 102 can include a chatbot component 114 designed and constructed to select, responsive to the digital file, a computer program that includes a chatbot for execution by the data processing system 102 or computing device 104 or third-party chatbot platform 146.

The chatbot component 114 can identify keywords, tokens, terms, concepts, or other information in the digital file. The chatbot component 114 can utilize the natural language processor component 112 to identify keywords, tokens, terms, concepts, or other information in the digital file. The natural language processor component 112 can provide the parsed keyword, token, term or concept to the chatbot component 114. The chatbot component 114 can select a chatbot that is responsive to a keyword or concept of the digital file.

For example, the data processing system 102 can determine that the first digital file includes a request for a recipe chatbot. The chatbot component 114 can perform a lookup in a chatbot data structure 132 to identify a chatbot that can provide recipes. For example, the chatbot data structure 132 can include keywords or other information that describes, for each chatbot, the goods, service or function the chatbot can provide. The chatbot component 114 can use the identifier determined via the chatbot data structure 132 to launch, initiate, execute or otherwise activate the corresponding chatbot. In some cases, the identifier can include or be associated with a filename or file path, pointer, web address, internet protocol address, uniform resource locator, or other identifying information for the chatbot. For example, the data processing system 102 can determine the recipe chatbot is provided via the third-party chatbot platform 146, and instruct the third-party chatbot platform 146 to launch the recipe chatbot and engage with the computing device 104 either directly or via the data processing system 102 (e.g., via the chatbot component 114).

Prior to launching or causing the launch or execution of the chatbot, the data processing system 102 can determine whether the computing device 104 is authorized to access the chatbot. The data processing system 102 (e.g., via chatbot component 114) can perform a lookup in the data repository 124 (e.g., profile data structure 126) with the identifier of the computing device 104 to determine if the computing device 104 is authorized to access the computer program comprising the chatbot. Authorization can be based on a subscription, plan, restriction, resource requirement, versioning, or device functionality. For example, the data processing system 102 can grant the computing device 104 access to the chatbot if the computing device 104 is configured with a predefined version of an operating system. In another example, the data processing system 102 can grant the computing device 104 access to the chatbot if the computing device 104 is associated with a valid account or profile. In some cases, if the data processing system 102 determines that the computing device 102 is not authorized to access the chatbot, the data processing system 102 can terminate the thread, prompt the user, or identify another chatbot the computing device 104 is authorized to access. Thus, the data processing system 102 can select the chatbot responsive to the determination that the computing device 104 is authorized to access to the chatbot.

The interface 110 can launch the chatbot itself, or transmit the instruction to a third-party chatbot platform 146 to cause the third-party chatbot platform 146 to invoke a conversational application programming interface associated with the chatbot (e.g., NLP component 142) and establish a communication session between the data processing system 102 or the third-party chatbot platform 146 and the client computing device 104. Responsive to establishing the communication session between the data processing system 102 or the third-party chatbot platform 146 and the client computing device 104, the data processing system 102 or third-party chatbot platform 146 can transmit data packets directly to the client computing device 104 via network 105. In some cases, the third-party chatbot platform 146 can transmit data packets to the client computing device 104 via data processing system 102 and network 105.

In some cases, the chatbot provider device 108, chatbot or third-party chatbot platform 146 can execute at least a portion of the conversational API 142. For example, the third-party chatbot platform 146 can handle certain aspects of the communication session or types of queries. The third-party chatbot platform 146 may leverage the NLP component 112 executed by the data processing system 102 to facilitate processing the audio signals associated with the communication session and generating responses to queries. In some cases, the data processing system 102 can include the conversational API 142 configured for third-party chatbot platform 146. In some cases, the data processing system routes data packets between the client computing device and the third-party provider device to establish the communication session. The data processing system 102 can receive, from the third-party chatbot platform 146, an indication that the third-party device established the communication session with the client device 104. The indication can include an identifier of the client computing device 104, timestamp corresponding to when the communication session was established, or other information associated with the communication session, such as the data structure associated with the communication session.

The conversational API can be a second NLP that includes one or more component or function of the first NLP 112. The second NLP 142 can interact or leverage the first NLP 112. In some cases, the system 100 can include a single NLP 112 executed by the data processing system 102. The single NLP 112 can support both the data processing system 102 and the chatbot. In some cases, interface 110 generates or constructs a data structure to facilitate performing a service, and the conversational API generates responses or queries to further a communication session with an end user or obtain additional information to improve or enhance the end user's experience or performance of the service.

The computer program comprising the chatbot can execute on the data processing system 102, chatbot provider device 108, or third-party chatbot platform 146. The chatbot can receive and process one or more digital files or portions of one or more digital files to determine a response. For example, the chatbot can execute as the chatbot component 114 on the data processing system 102.

The chatbot, upon execution, can identify a dialog data structure that is responsive to the digital file. For example, the digital file can correspond to a voice input of "I need a recipe for chicken wings." The chatbot, such as a recipe chatbot, can identify a dialog data structure responsive to the query using a natural language processing technique, search engine technique, pattern matching technique, or semantic analysis technique. For example, the dialog data structure can include ingredients for chicken wings. The dialog data structure can include a placeholder field. The placeholder field can be populated with a content item. The placeholder field can serve as a tag or indication that triggers a request for content.

The developer of the chatbot can include the placeholder field as part of the computer program for the chatbot or the response for the query. The developer of the chatbot can program the placeholder field using an application programming interface, script, tag, markup language or other mechanism that allows the chatbot to identify the placeholder field, request content, and populate the placeholder field with a selected content item. The placeholder field can be associated with metadata that provides content selection criteria that can be used to select a content item that is relevant to the dialog data structure and appropriate for insertion in the placeholder field. For example, if the dialog data structure is a list of ingredients, and the placeholder field precedes and modifies the term "cola", then the metadata or content selection criteria can indicate to select a content item that includes a brand name or company that sells cola.

In some cases, the dialog data structure may not include a placeholder field. The data processing system 102 can receive or intercept the identified dialog data structure. The data processing system 102 can include a placeholder generation component 116 designed and constructed to identify a portion of the dialog data structure at which to insert the placeholder field. The placeholder generation component 116 can use or interface with the natural language processing component 112 to process the dialog data structure and identify a portion at which to insert the placeholder field. The placeholder generation component 116 can identify the portion based on keywords or terms in the dialog data structure. The placeholder generation component 116 can identify the portion based on available content items. For example, the placeholder generation component 116 can identify the keyword "cola" in the dialog data structure, and further determine that there is placeholder field preceding the term "cola". The placeholder generation component 116 can determine that content data data structure 130 includes content items associated with keyword "cola". The placeholder generation component 116 can determine to initiate a content selection process for keyword "cola", and insert the selected content item adjacent to the term "cola" in the dialog data structure.

The placeholder generation component 116 can determine whether and where to insert the placeholder field, or content item thereof, using the natural language processing technique (e.g., via natural language processor component 112). For example, the placeholder generation component 116 can use the NLP component 112 to identify a grammar and syntax of the dialog data structure as well as keywords of the data structure. Based on the keyword, grammar, and syntax, the placeholder generation component 116 can determine where to insert the placeholder field. Grammar can refer to a set of rules in a given language. Syntax can refer to the structure of the sentence. Based on the grammar and syntax of the dialog data structure, the placeholder generation component 116 can determine an appropriate position for the placeholder field. For example, placeholder generation component 116 can determine to place the placeholder field adjacent to and before a noun in the dialog data structure. The placeholder generation component 116 can determine to place the placeholder field adjacent to and before a noun in the dialog data structure that is located at the beginning, middle or end of the dialog data structure. The placeholder generation component 116 may determine not to position the placeholder field adjacent to a verb, pronoun, adjective, or adverb. In some cases, the placeholder generation component 116 may determine not to insert a placeholder field in the dialog data structure. For example, the only noun in the dialog data structure may be the first term in the dialog data structure, and the placeholder generation component 116 can be configured to not insert a content item as the first term in the dialog data structure.

Thus, the data processing system 102 can automatically insert a placeholder field in a dialog data structure, and populate the placeholder field with a content item. By automatically generating the placeholder field, the chatbot computer program may occupy less memory or have less complicated and error prone code because the developer may not include placeholder fields in each dialog data structure.

The chatbot, upon identifying the placeholder field, can transmit a request for content. In some cases, the placeholder generation component 116, upon determining to insert the placeholder field, can trigger the content selection process via the content selector component 118 without returning the dialog data structure to the chatbot.

The data processing system 102 can include, execute, or otherwise communicate with a content selector component 118 to receive the trigger keyword identified by the natural language processor and select, based on the trigger keyword, a content item via a real-time content selection process. The content selection process can refer to, or include, selecting sponsored content item objects provided by third party content providers 106. The real-time content selection process can include a service in which content items provided by multiple content providers are parsed, processed, weighted, or matched in order to select one or more content items to provide to the computing device 104. The content selector component 118 can perform the content selection process in real-time. Performing the content selection process in real-time can refer to performing the content selection process responsive to the request for content received via the client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104, or within a time interval after the communication session is terminated.

For example, the data processing system 102 can include a content selector component 118 designed, constructed, configured or operational to select content item objects. The content selector component 118 can identify, analyze, or recognize voice, audio, terms, characters, text, symbols, or images of the candidate content items using an image processing technique, character recognition technique, natural language processing technique, or database lookup. The candidate content items can include metadata indicative of the subject matter of the candidate content items, in which case the content selector component 118 can process the metadata to determine whether the subject matter of the candidate content item corresponds to the input audio signal.

Content providers 106 can provide additional indicators when setting up a content campaign that includes content items. The content provider computing device 106 can provide information at the content campaign or content group level that the content selector component 118 can identify by performing a lookup using information about the candidate content item. For example, the candidate content item may include a unique identifier, which may map to a content group, content campaign, or content provider. The content selector component 118 can determine, based on information stored in content campaign data structure in data repository 124, information about the content provider computing device 106.

The data processing system 102 can receive a request for content for provision via a computing device 104. The request can include selection criteria of the request, such as the device type, location, and a keyword associated with the request. The request can include the dialog data structure.

Responsive to the request, the data processing system 102 can select a content item object from data repository 124 or a database associated with the content provider computing device 106, and provide the content item for presentation via the computing device 104 via network 105. The content item object can be provided by a content provider device 108 different from the chatbot provider device 108. The computing device 104 can interact with the content item object. The computing device 104 can receive an audio response to the content item. The computing device 104 can receive an indication to select a hyperlink or other button associated with the content item object that causes or allows the computing device 104 to identify content provider computing device 106, request a service from the content provider computing device 106, instruct the content provider computing device 106 to perform a service, transmit information to the content provider computing device 106, or otherwise identify a good or service associated with content provider computing device 106.

The request for content can include content selection criteria, such as a format of the content, keywords, concepts, profile information, or other information that can facilitate content selection. The content selector component 118 can perform a real-time content selection process. Real-time content selection can refer to performing the content selection responsive to the request for content. The request for content can be generated, transmitted or otherwise provided after the chatbot identifies the dialog data structure that is responsive to the voice input.

The content selector component 118 can select a content item that includes text, string, or characters that can be processed by a text to speech system. The content selector component 118 can select a content item that is in a parameterized format configured for a parametrically driven text to speech technique. In some cases, the dialog data structure can be in SSML format or be configured with voice parameters. The data processing system 102 can configure the voice parameters of the content item to match the voice parameters of the dialog data structure identified by the chatbot such that the content item can be presented to the user of the computing device 104 with a native voice, image, or acoustic fingerprint (e.g., the content item has the same or similar acoustic properties as compared to the dialog data structure without the content item).

The content selector component 118 can select a content item that is in a parameterized format configured for text to speech instead of a content item that is in an audio file format. For example, the content selector component 118 may not select a content item in an audio file in an audio file format or audio coding format, such as .WAV, .AIFF, or .AU, because a content item already in an audio file format may not be configured for seamless insertion into the placeholder field of the dialog data structure identified by the chatbot computer program. A content item in an audio file format may have a different acoustic fingerprint as compared to a native voice of the computing device or the acoustic fingerprint set for the chatbot. If the content item audio file has a different acoustic fingerprint as compared to the native voice or acoustic fingerprint of the chatbot or the dialog data structure (e.g., words are spoken at different rate, at a different frequency, different pitch, different tone, different volume, or different accent), then inserting or integrating the content item audio file into the placeholder field in the dialog data structure may not be seamless, smooth or continuous. For example, the content item audio file having the different acoustic fingerprint can cause awkward transitions or indication of disparity. Thus, by providing the content item configured for a text to speech technique in which the chatbot or computing device can play the content item in a manner that corresponds to the acoustic fingerprint or native voice of the chatbot or computing device, the data processing system 102 can facilitate providing the seamless modification of chatbot computer program output.

The content selector component 118 can provide the selected content item to the chatbot to cause the computing device to perform the text to speech technique to generate an acoustic signal corresponding to the dialog data structure modified with the selected content item. In some cases, the data processing system 102 can transmit data packets corresponding to the content item. The data processing system 102 can transmit data packets corresponding to the dialog data structure modified with the content item.

The data processing system 102 can include, execute, access, or otherwise communicate with a session handler component 120 to establish a session. The session handler component 120 can establish the session responsive to the first digital file. For example, the session handler component 120 can establish a communication session between the client device 104 and the data processing system 102. The communication session can refer to one or more data transmissions between the client device 104 and the data processing system 102 that includes the digital file corresponding to the input audio signal that is detected by a sensor 134 of the client device 104, and the output signal transmitted by the data processing system 102 to the client device 104. The data processing system 102 (e.g., via the session handler component 120) can establish the communication session responsive to receiving the input audio signal. The data processing system 102 can set a duration for the communication session. The data processing system 102 can set a timer or a counter for the duration set for the communication session. Responsive to expiration of the timer, the data processing system 102 can terminate the communication session.

The session handler component 120 can determine a break, pause, or end of the session based on one or more of a temporal threshold, a location threshold, or natural language processing. The temporal threshold can include, for example, a time interval such as 5 minutes, 10 minutes, 15 minutes, 20 minutes, 30 minutes, 1 hour, 2 hours, 6 hours, or more. The location threshold can refer to a distance between the location of the computing device 104 at the time the session is established, and a current location of the computing device 104. The distance threshold can be 0.5 miles, 1 mile, 2 miles, 3 miles, 5 miles, 10 miles, 20 miles, 50 miles or more. The temporal threshold and location threshold can be dynamic thresholds that vary based on time of day, geographic location, population density, historical profile information, type of chatbot, or other information associated with the session. For example, the temporal threshold and distance may be shorter if the chatbot is related to finding a coffee shop as compared to a chatbot that facilitates booking a travel vacation because the process of booking a travel vacation can span several days. The natural language processing can indicate a break based on a change in a topic or category of the conversation.

The communication session can refer to a network-based communication session in which the client device 104 provides authenticating information or credentials to establish the session. In some cases, the communication session refers to a chatbot, topic or a context of audio signals carried by data packets during the session. For example, a first communication session can refer to audio signals transmitted between the client device 104 and the data processing system 102 that are related to (e.g., include keywords, dialog data structures, chatbot, or content item objects) a recipe; and a second communication session can refer to audio signals transmitted between the client device 104 and data processing system 102 that are related to movie tickets. In this example, the data processing system 102 can determine that the context of the audio signals is different (e.g., via the NLP component 112), and separate the two sets of audio signals into different communication sessions. The session handler 114 can terminate the first session related to the recipe responsive to identifying one or more audio signals related to the movie tickets. Thus, the data processing system 102 can initiate or establish the second session for the audio signals related to the movie tickets responsive to detecting the context of the audio signals.

The session handler component 120 be designed and constructed to allow reuse of a content item that was previously selected for provision with a dialog data structure. The session handler component 120 can prevent, block, disable, or cancel a second content selection process by the content selector component 118 responsive to the session handler component 120 determining to reuse a previously selected content item. By avoiding a redundant content selection process, or otherwise eliminating a content selection process, the session handler component 120 can reduce processor and other computational resource utilization by the data processing system 102.

The data processing system 102 can reuse or resurface the content item during a same session, or after determining a session break and determining to merge the subsequent session with the previous session in order to resume the previous session. The data processing system 102 can resume a session after determining a break in the session. The data processing system 102 can resume the session if a subsequent digital file, voice input, semantic input, or other information associated with the subsequent digital file or voice input indicates that the current voice input corresponds to or relates to a previous session. For example, the session handler 120 can, via the natural language processor component 112, compare a second digital file received after a session break with a first digital file received before the session break to determine that they are related to one or more of a same topic, category, task flow, chatbot, computing device, or dialog data structure. For example, the computing device 104 can invoke the same chatbot subsequent to the session break, and the data processing system 102 can determine to resume the previous session.

To identify the content item to reuse, the data processing system 102 can associate the previously selected content item with a value in the index data structure 128. The value can be generated based on a first identifier of the chatbot associated with the selection of the content item, a second identifier for a first dialog data structure with which the content item was provided, and a third identifier for the computing device 104 associated with the provision of the content item. If the session handler component 120 determines that a subsequent request for content item is associated with the same value, the session handler component 120 can determine to reuse the previously selected content item.

For example, the selected content item "Brand A" may have been initially provided, via computing device 104, with a dialog data structure that includes "ingredient: <placeholder> cola" as follows "ingredient: Brand A cola" as identified by chatbot. The first, second and third identifiers can be alphanumeric identifiers, such as: first identifier: chatbot_123; second identifier: dialog_data_structure_123; third identifier: computing_device_123. The identifier of the dialog data structure can correspond to the topic, concept, category, or exact phrase of the dialog data structure. For example, the second identifier dialog_data_structure_123 can correspond to all dialog data structures that provide a chicken wing recipe. In another example, the second identifier dialog_data_structure_123 can correspond to all dialog data structures that provide a chicken wing recipe with cola. In another example, the second identifier dialog_data_structure_123 can correspond to all dialog data structures that provide a chicken wing recipe with cola with a placeholder field immediately preceding the term "cola". The index value can be formed of these three tuples, or another number tuple. The index value can be formed using a hash function that hashes the tuple comprising the first, second and third identifiers. The index value can refer to a hash value and be stored in a hash table (e.g., index data structure 128). The index value can be numeric, alphanumeric, or contains symbols or other identifiers. The index value can correspond to a row and column in a table, or entries in a multi-dimensional table. The index value can correspond to a field in a data structure, such as index value{first identifier, second identifier, third identifier}.

The data processing system 102 can associate the content item with the generated index value in the index data structure 128. The data processing system 102 can associate, assign, or set additional parameters or conditions for the association. The data processing system 102 can set a duration for the association between the content item and the generated index value, a geographic condition for the association, or a semantic condition. For example, if the duration of the session exceeds a time interval (e.g., 5 minutes, 10 minutes, 20 minutes, 30 minutes, 1 hour, 2 hours, 6 hours, 12 hours, or more), the data processing system 102 can terminate, break or end the association between the content item and the index value. If the computing device 104 has traveled or moved greater than a distance (e.g., 0.5 miles, 1 mile, 2 miles, 3 miles, 5 miles, 10 miles, 20 miles, 30 miles, or more) from whether the computing device 104 was located when the association between the content item and the index value was created, the data processing system 102 can determine to terminate, break, or end the association.

The data processing system 102 can utilize the association between the content item and the index value to reuse the content item in a second dialog data structure. For example, the data processing system 102 can receive a second digital file corresponding to another acoustic signal carrying voice content detected by the microphone on the computing device 104. The data processing system 102 can select, responsive to the second voice content of the second digital file, the computer program comprising the chatbot corresponding to first identifier: chatbot_123. The chatbot can identify a second dialog data structure comprising a second placeholder field. The chatbot can determine that the second dialog data structure has a fourth identifier that corresponds to the second identifier of the first dialog data structure. For example, the second dialog data structure and the first dialog data structure can both be related to a recipe for chicken wings and, therefore, correspond to the same identifier. Since the second dialog data structure is associated with the same chatbot, computing device, and dialog data structure identifier, the data processing system 102 can determine to reuse the previously selected content item for the placeholder field in the second dialog data structure. The data processing system 102 can generate the index value with the identifiers from the second dialog data structure, select the content item associated with the same index value in the index data structure 128, and provide the same content item with the second dialog data structure to cause the chatbot or computing device to generate an acoustic signal corresponding to the second dialog data structure modified with the same content item.

For example, the first dialog data structure with the content item can be: "Ingredients for chicken wings includes Brand A cola". The second dialog data structure with the reused content item can be: "In a casserole, combine 1 can of the Brand A cola with the onions, garlic, and brown sugar." Thus, the content item "Brand A" is reused in the second dialog data structure, thereby eliminating a second content selection process and reducing computing resource utilization by the content selector component 118.

In some cases, the data processing system 102 can reuse the content item across different chatbots. For example, the content item can be selected for insertion in a dialog data structure identified by a first chatbot, such as a recipe chatbot. Subsequent to provision of the content item with the first dialog data structure of the first chatbot, a second chatbot can be invoked via the computing device 104. The second chatbot can be invoked based on a second digital file received via the computing device 104. The second chatbot can identify a second dialog data structure responsive to the second digital file. For example, the second digital file can correspond to a request for movie times, the second chatbot can be a movie chatbot, and the second dialog data structure can be a list of one or more movie times, such as "Movie A is playing at Local Theater today at 6 PM, 7:30 PM and 9:00 PM." Since the identifier of the second chatbot and second dialog data structure may be different from the first chatbot and first dialog data structure, the data processing system 102 may not generate the same index value for the second chatbot as compared to the index value generated for the first chatbot. However, the data processing system 102 can utilize different identifiers or techniques to determine to reuse the content item. For example, the data processing system 102 can determine that the movie theater identified by the second chatbot in the second dialog data structure provides the good or service corresponding to the content item selected for provision with the first dialog data structure. The data processing system 102 can then determine that the identifier of a product associated with the content item, or keyword associated with the content item, matches or corresponds to metadata associated with the local movie theater identified by the second chatbot. Thus, the data processing system 102 can determine to reuse the content item with the second dialog data structure, as follows: "Movie A is playing at Local Theater today at 6 PM, 7:30 PM and 9:00 PM, which sells Brand A cola."

The data processing system 102 may automatically insert the placeholder in the second dialog data structure, or the second dialog data structure may be configured with the placeholder. For example, the second dialog data structure can include a second placeholder as follows: "Movie A is playing at Local Theater today at 6 PM, 7:30 PM and 9:00 PM. Get there in time to grab <second placeholder> before the show." In this case, the second placeholder can be populated with brand name products, such as soda, candy, popcorn, ice cream, pizza, or other product. The second placeholder can be associated with content selection criteria or metadata that indicates that a content selection process can use keywords soda, candy, popcorn, ice cream, pizza to identify a content item. The data processing system 102 can perform a second content selection process to identify a content item for the second placeholder, or determine to reuse a previously selected content item in order to reduce computational resource utilization. In some cases, the data processing system 102 can determine to reuse the content item to reduce resource consumption based on a current load on the data processing system 102, historical load patterns, or bandwidth availability of the computing device 104. For example, if the time of day corresponds to a peak load for data processing system 102, then data processing system 102 can determine to reuse the first content item instead of executing a new content selection process.

The data processing system 102 can identify the content item to reuse based on comparing the second placeholder field with the first placeholder field to determine a similarity. For example, the first placeholder field can have keyword "cola" and the second placeholder field can also have keyword "cola." In some cases, the first and second placeholder field can be the same placeholder field, such as a placeholder field for a brand of cola, and have the same identifier. In some cases, the identifier of the placeholder field can refer to one or more keywords or content selection criteria associated with the placeholder field. The index value generated for reuse of content items across multiple chatbots can be generated using a hash of an identifier of the first placeholder field and the identifier of the computing device, where the identifier of the first placeholder field can include a keyword or topic of the placeholder field. The content item can be associated with multiple index values if there are multiple keywords for the placeholder field in which the content item is populated. The reuse of the content item can cross-over to multiple chatbots to provide further optimizations or reductions in computation or energy resource utilization.

The second dialog data structure identified by the second chatbot may not include a second placeholder field, in which case the data processing system 102 can, via placeholder generation component 116, insert the second placeholder field at a position in the second dialog data structure, and populate the second placeholder field with the reused content item. For example, the data processing system 102 can determine that metadata or keywords associated with the second dialog data structure correspond to keywords associated with the content item, and determine, based on this relevancy or match, to insert a second placeholder and populate the second placeholder with the content item. In some cases, the data processing system 102 can determine to insert the placeholder based on determining that a previously selected content item is relevant or corresponds to the second dialog data structure (e.g., based on one or more keyword matches, such as a broad, phrase or exact match).

In some cases, the second chatbot can identify the second dialog data structure based on the previously selected content item. For example, the data processing system 102 can select a second dialog data structure having a grammar and syntax that allows for the insertion of a second placeholder field having the content item. The candidate second dialog data structures can include placeholder fields at different positions, and the data processing system 102 can select a second dialog data structure based on a parameter associated with the content item provided with the first dialog data structure identified via the first chatbot. For example, the content item may indicate a position requirement in a dialog data structure such as: beginning portion, within first three words of sentence, within last three words of sentence, within middle 3 words, adjacent to and preceding a noun, or not adjust to or proceeding a proper noun, adjective or verb. The data processing system 102, or second chatbot, can accordingly select a second dialog data structure that satisfies criteria of the content item in order to reuse the content item. For example, the second chatbot can identify multiple structures or configurations for the second dialog data structure, or multiple candidate second dialog data structures, and the data processing system 102 can select the second dialog data structure based on the content item.

The first and second chatbots can have the same or different acoustic fingerprint or voice. Since the content item can be configured for a parametrically driven text to speech technique, or otherwise converted to voice, the first and second chatbot can assign native voice parameters to the content item for provision with the respective dialog data structures. Thus, the content item can be presented in a first voice to match the voice of the first dialog data structure identified by the first chatbot, and later played in a different voice that matches the voice of the second dialog data structure identified by the second chatbot. The content item can appear to be in the native voice of the corresponding chatbot or dialog data structure.

The data processing system 102 can reuse the content item with multiple chatbots in a same session, across multiple sessions, or after resuming a session break. For example, the data processing system 102 can identify the session break based on temporal or location thresholds, and determine to resume the session based on a subsequently received digital file (e.g., matching keywords, topic, or category), and then reuse the content item. In some cases, the second chatbot can query the first chatbot to identify the content item used by the first chatbot, which can be stored in chatbot data data structure 132 or on third-party chatbot platform 146.

The data processing system 102 can include a validation component 122 designed, constructed and operational to validate a third-party chatbot platform using a validation technique. Validation can refer to determining whether the content item selected by the data processing system 102 for inclusion with the dialog data structure was indeed the content item that the third-party chatbot platform 146 provided to the chatbot. The data processing system 102 can perform validation to determine whether the third-party chatbot platform 146 accurately and reliably forwarded the selected content item to the chatbot. For example, the third-party chatbot platform 146 may contain errors, bugs, faults, or other technical problems that result in an incorrect content item being forwarded to the chatbot. By validating the third-party chatbot platform 146, the data processing system 102 can determine to disable the provision of content items or otherwise alert the third-party chatbot platform 146 or chatbot provider device 108 or content provider device 106.

For example, the data processing system 102 can provide a content item to a third-party chatbot server with instructions to forward the content item to the chatbot for insertion in a dialog data structure. The data processing system 102 (e.g., via the validation component 122) can then ping the chatbot for the content item, and compare the response from the chatbot with the content item that was initially provided to the third-party chatbot platform to determine whether they match, or if the third-party chatbot platform modified the content item.

Subsequent to transmission of the content item for provision with the dialog data structure, the validation component 122 can ping the chatbot for the content item. The data processing system 102 can ping the chatbot or computing device 104 executing the chatbot, or third-party chatbot platform 146. The data processing system 102 can ping the chatbot provider device 108, which may store information related to the content item. The data processing system 102 can ping the content provider device 106 for network activity associated with presentation of the content item. The data processing system 102 can ping the chatbot based on a time interval. The time interval can include a time interval subsequent to provision of the content item, or be based on a timing function. The timing function can produce a random time interval within a range, such as 5 minutes after transmission of the content item, 10 minutes after transmission of the content item, 30 minutes after transmission of the content item, 5 seconds after transmission of the content item, between 10 seconds and 5 minutes of transmission of the content item, between 1 minute and 30 minutes of transmission of the content item, or other range. By using a timing function that can be random or pseudo random (e.g., determined using a random number generator), the data processing system 102 can mitigate fraud or malicious acts of the third-party chatbot platform.

The data processing system 102 can receive, from the chatbot, an indication of the content item responsive to the ping. The indication can include an identifier of the content item. The indication can include information about how the content item was presented, such as an identifier of the chatbot, placeholder field, keywords, timestamp, or computing device 104. The data processing system 102 can compare the received indication with information associated with the content item provided by the data processing system 102. For example, the data processing system 102 can compare a first timestamp at which the data processing system 102 transmitted the content item to the third-party chatbot platform with a second timestamp at which the chatbot inserted or presented the content item. The data processing system can set a validation parameter based on a difference between the first timestamp and the second timestamp. For example, if the time difference is greater than 30 seconds, 1 minute, 2 minutes, 5 minutes, 10 minutes or more, then the data processing system 102 can determine that the delay is an indication of a technical problem (e.g., high network latency, high processor latency, or issues with the platform code or chatbot program). The data processing system 102 can set a validation parameter based on a comparison of the identifier of the content item provided to the third-party chatbot platform 146, and the indication of the content item received from the chatbot.

The data processing system 102 can set a validation parameter based on the comparison of the received indication of the content item with the identifier of the content item selected by the data processing system 102. If the data processing system 102 determines, based on the comparison, that the content items do not match (e.g., chatbot did not receive the same content item selected by the data processing system 102 for the chatbot), the data processing system 102 can set the validation parameter to indicate invalidity (e.g., 0, N, or other alphanumeric value or symbol that indicates invalidity, fraud or malicious activity). If the data processing system 102 determines that the content items match, then the data processing system 102 can set the validation parameter to indicate that the third-party chatbot platform 146 is valid.

The data processing system 102 can set the validation parameter based on a statistical analysis of multiple pings to one or more chatbots provided by the third-party chatbot platform 146. For example, if greater than a threshold percentage (e.g., 0.1%, 0.5%, 1%, 2%, 5%, 10%, 15%, 20% or more) of pings results in determining a mismatch between the content item provided by the data processing system 102 and the content item forwarded to the third-party chatbot platform 146, then the data processing system 102 can flag or set the validation parameter as invalid for the third-party chatbot platform 146.

In some cases, the data processing system 102 can disable the provision of content items to chatbots provided by the third-party chatbot platform 146 responsive to the validation parameter being invalid. For example, the data processing system 102 can ignore or disregard requests for content from the third-party chatbot platform 146, thereby reducing computational resource utilization by not wasting processor and memory utilization by performing a content selection process for a third-party chatbot platform 146 that may be a malicious actor or otherwise have technical problems that result in the presentation of an incorrect content item or delayed presentation of the content item.

The data processing system 102 can receive indications of interactions with the content item. The interaction with the content item can occur via an interface or component of the computing device 104. The data processing system 102 can record, store or otherwise monitor and track the interactions with the content item, and information about or associated with the interaction. The data processing system 102 can further record, store or otherwise tag the interaction as being valid based on application of the validation technique to the third-party chatbot platform 146. For example, if the data processing system 102 determines that the content item selected and provided by the data processing system to the third-party chatbot platform 146 matches the content item presented by the chatbot, the data processing system 102 can record a subsequent interaction with the content item via the computing device 104 as being a valid interaction. If, however, the data processing system 102 determines that the content items do not match, then the data processing system 102 can mark or flag the interaction as invalid. The data processing system 102 can generate and transmit an alert to a content provider device 106 responsive to detecting the invalid interaction. The content provider device 106 can correspond to the provider of the content item selected by the data processing system 102, which can be different form the provider of the content item that was actually provided to and presented by the chatbot.

In some cases, the data processing system 102 can encrypt the content item prior to transmitting the content item to the third-party chatbot platform 146. The chatbot can include the key to decrypt the content item prior to presenting the content item. By encrypting the content item, the data processing system 102 can securely transmit the content item without the content item being manipulated by an intermediary device.

The encryption technique can include a hash function. The encryption technique can include hashing the content item with salts. Salts can refer to data (e.g., random data or predetermined data that is not known to the third-party chatbot platform 146) that can be used as an additional input to a function that hashes the content item. The data processing system 102 can store the content item encrypted with a hash function and salts. The data processing system 102 can provide the encrypted content item to the third-party chatbot platform 146 for forwarding to the chatbot. The chatbot can be configured with a decryption technique to decrypt the content item encrypted with the hash function and salts such that the content item can be recovered and presented. Since the third-party chatbot platform 146 may not have access to the encryption function, hash function, or salts, a fraudulent or incorrect content item provided by the third-party chatbot platform 146 to the chatbot would not be properly decrypted and presented by the chatbot. Thus, the encryption technique can be used to prevent the fraudulent or inaccurate presentation of content items by the chatbot.

Figure 2:
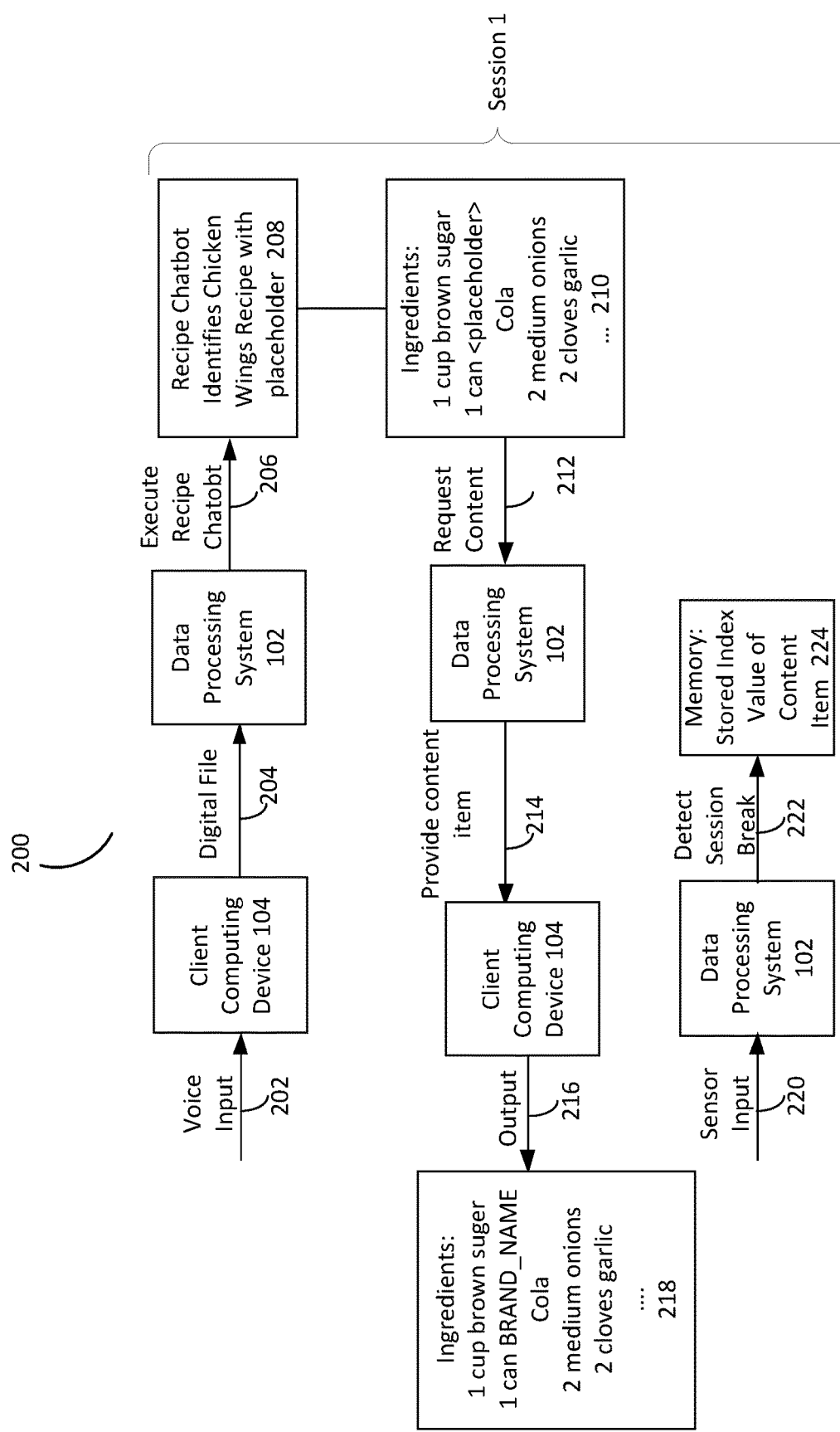
FIG. 2 is an illustration of an operation of a system to modify computer program output via a network.

FIG. 2 is an illustration of an operation of a system 200 to modify computer program output via a network. At ACT 202, the client computing device 104 can receive voice input (or other non-text input such as image or video input). The voice input can be spoken by a user of the computing device 104. The computing device 104 can convert the voice input from an analog format (e.g., as detected by a transducer or microphone) to a digital format. The computing device 104 can transmit the digital format of the voice input in a digital file at ACT 204 to the data processing system 102.

In some cases, the input 202 can include image or video input in addition to, or instead of, voice input. The computing device 104 can use one or more imaging techniques (e.g., computer vision, machine learning, image recognition, or image interpretation) to process or analyze the image, and convert the image to the digital file. In some cases, the computing device 104 can convert the image or video input to a digital file without performing an imaging technique to further process, analyze or interpret the image. Instead, the computing device 104 can forward or transmit the digital file corresponding to the input image or video to the data processing system for further image processing. The images and video input can be sensed or detected by the computing device 104 and converted to the digital file, or the computing device 104 can retrieve the images or video from a remote source, such as a data repository, external storage device, third-party data storage unit via a network, or other computing device. The image and video input can be processed or parsed to obtain the same type of information that is obtained when the voice input 202 is processed or parsed.

The data processing system 102 can process the digital file and invoke a chatbot at ACT 206. The data processing system 102 can invoke the chatbot based on a trigger keyword or semantic processing of the digital file. At ACT 208, a recipe chatbot, for example, invoked by the data processing system 102 can identify a recipe requested by the voice input at ACT 202. For example, the identified recipe can be for chicken wings. The recipe can be stored in a dialog data structure. The dialog data structure can include text. For example, the text can be the ingredients in the identified recipe for the chatbot. The text can also include instructions on how to prepare the ingredients to make the chicken wings, or other information that can facilitate preparation of the chicken wings.

The recipe chatbot can further identify a placeholder field in the dialog data structure at ACT 208. For example, the dialog data structure with the placeholder field can be "Ingredients: 1 cup brown sugar, 1 can <placeholder> cola, 2 medium onions, 2 cloves garlic" 210. Responsive to identifying the <placeholder> field, the data processing system 102 can receive a request for content at ACT 212. The chatbot can generate the request, the third-party chatbot platform can generate the request, the computing device can generate the request, or a component of the data processing system can generate the request. The data processing system 102 can receive the request and select a content item. The data processing system 102 can provide the selected content item at ACT 214. The data processing system 102 can provide the content item to the chatbot, to the client computing device 104, the third-party chatbot platform or other entity. The data processing system 102 can, in some cases, integrate or embed the content item with the dialog data structure. For example, if the data processing system 102 receives or has access to the dialog data structure 210, the data processing system 102 can embed the content item in the dialog data structure 210, and provide the modified dialog data structure that includes the content item to the client computing device 104. The client computing device 104 can output the modified dialog data structure at ACT 216 as follows: "Ingredients: 1 cup brown sugar, 1 can Brand_Name cola, 2 medium onions, 2 cloves garlic" 218.

The data processing system 102 can determine that ACTS 202 through 218 correspond to Session 1. The data processing system can then determine a session break. For example, the data processing system 102 can receive sensor input 220 that indicates a break, such as location information, timer information, physical activity information, voice input, or the lack of sensory input indicating an idle state of use. At ACT 222, the data processing system 102 can detect the session break based on the sensor input 220 (or lack thereof), generate an index value for the selected content item to potentially reuse the content item in a later session or upon resumption of the session, and store the content item in association with the index value in memory 224.

Figure 3:
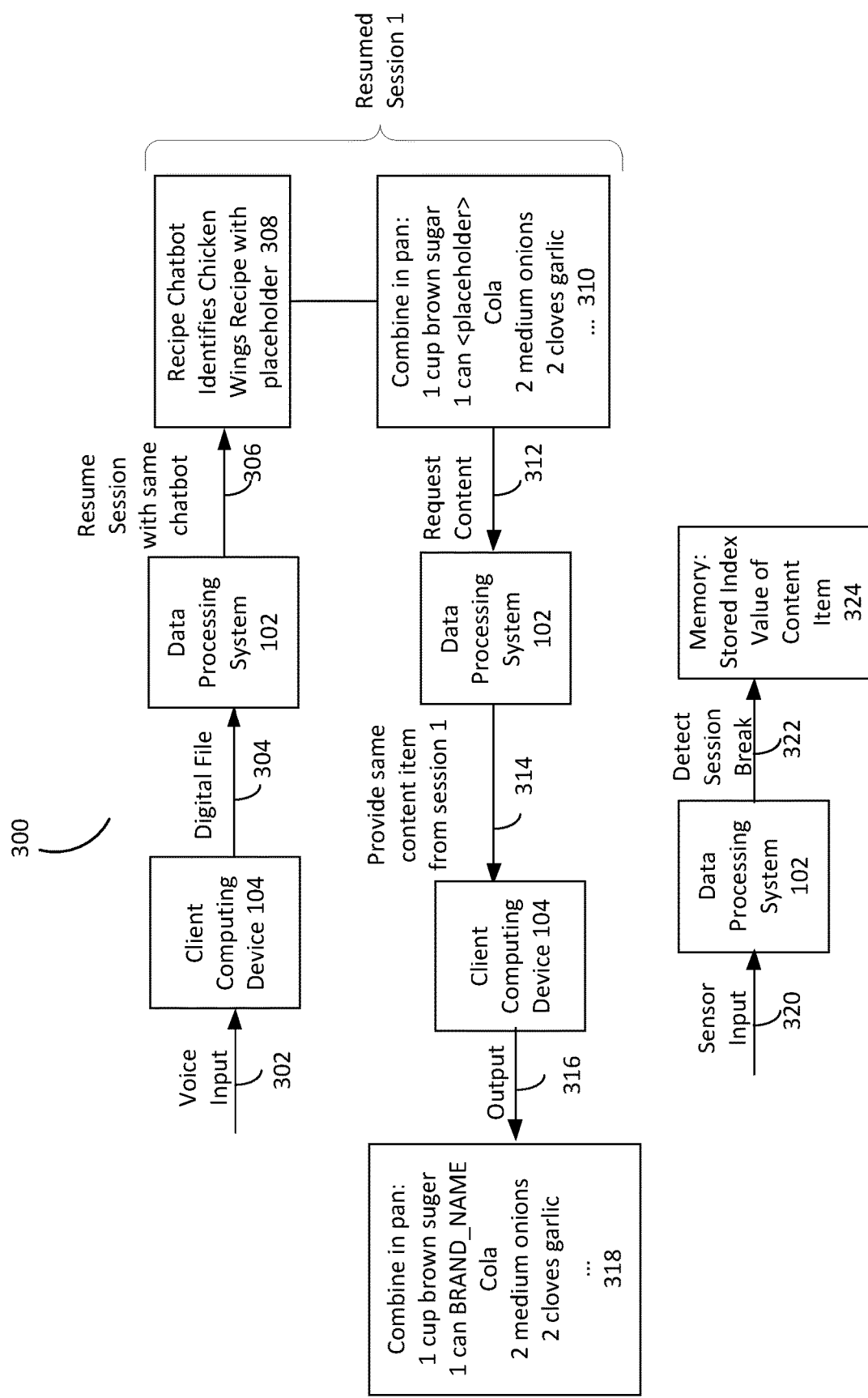
FIG. 3 is an illustration of an operation of a system to balance data requests for modification of computer program output based on a session.

FIG. 3 is an illustration of an operation of a system 300 to balance data requests for modification of computer program output based on a session. At ACT 302, the computing device 104 receives voice input (or other non-text input such as image or video). At ACT 304, the client computing device can transmit a digital file corresponding to the received voice input to the data processing system 120. The data processing system 102 can process the digital file to determine that the voice input corresponds to a previous Session 1, as illustrated in FIG. 2. For example, the voice input can correspond to how to prepare the ingredients presented in 210 in order to prepare the dish.

In some cases, the input 302 can include image or video input in addition to, or instead of, voice input. The computing device 104 can use one or more imaging techniques (e.g., computer vision, machine learning, image recognition, or image interpretation) to process or analyze the image, and convert the image to the digital file. In some cases, the computing device 104 can convert the image or video input to a digital file without performing an imaging technique to further process, analyze or interpret the image. Instead, the computing device 104 can forward or transmit the digital file corresponding to the input image or video to the data processing system for further image processing. The data processing system 102 can process the digital file corresponding to the image or video input to determine that the input 302 corresponds to the previous Session 1. The image and video input can be processed or parsed to obtain the same type of information that is obtained when the voice input 302 is processed or parsed.

At ACT 306, the data processing system 102 can resume the session with the same recipe chatbot, which can identify the same recipe 308 and instructions to prepare the recipe as follows: "Combine in pan: 1 cup brown sugar, 1 can <placeholder> cola, 2 medium onions, 2 cloves garlic" 310. The preparation instructions can be in the form of a second dialog data structure. The second dialog data structure can include a second placeholder field. The chatbot, or other related device or system, can transmit a request for content to the data processing system 102 at ACT 312. The data processing system 102, responsive to the request, can select the same content item provided at ACT 214 previously during Session 1. The data processing system 102 can select the same content based on identifiers and a generated index value that is associated with the content item in memory. At ACT 314, the data processing system 102 can provide the same content item from session 1 to the client computing device 104. At ACT 316, the client computing device can output the dialog data structure modified with the content item as follows: "Combine in pan: 1 cup brown sugar, 1 can Brand_Name cola, 2 medium onions, 2 cloves garlic" 318.

At ACT 320, the data processing system can receive sensor input (e.g., from computing device 104), and detect a session break at ACT 322. The data processing system 102 can store, in memory, the index value associated with the second presentation of the content item in memory 324. The data processing system 102 can store the second index value in addition to the previously generated index value. The index values may be the same, or additional index values can be generated for associated with the content item. For example, the second dialog data structure may be associated with additional identifiers or keyword as compared to the first dialog data structure.

Figure 4:
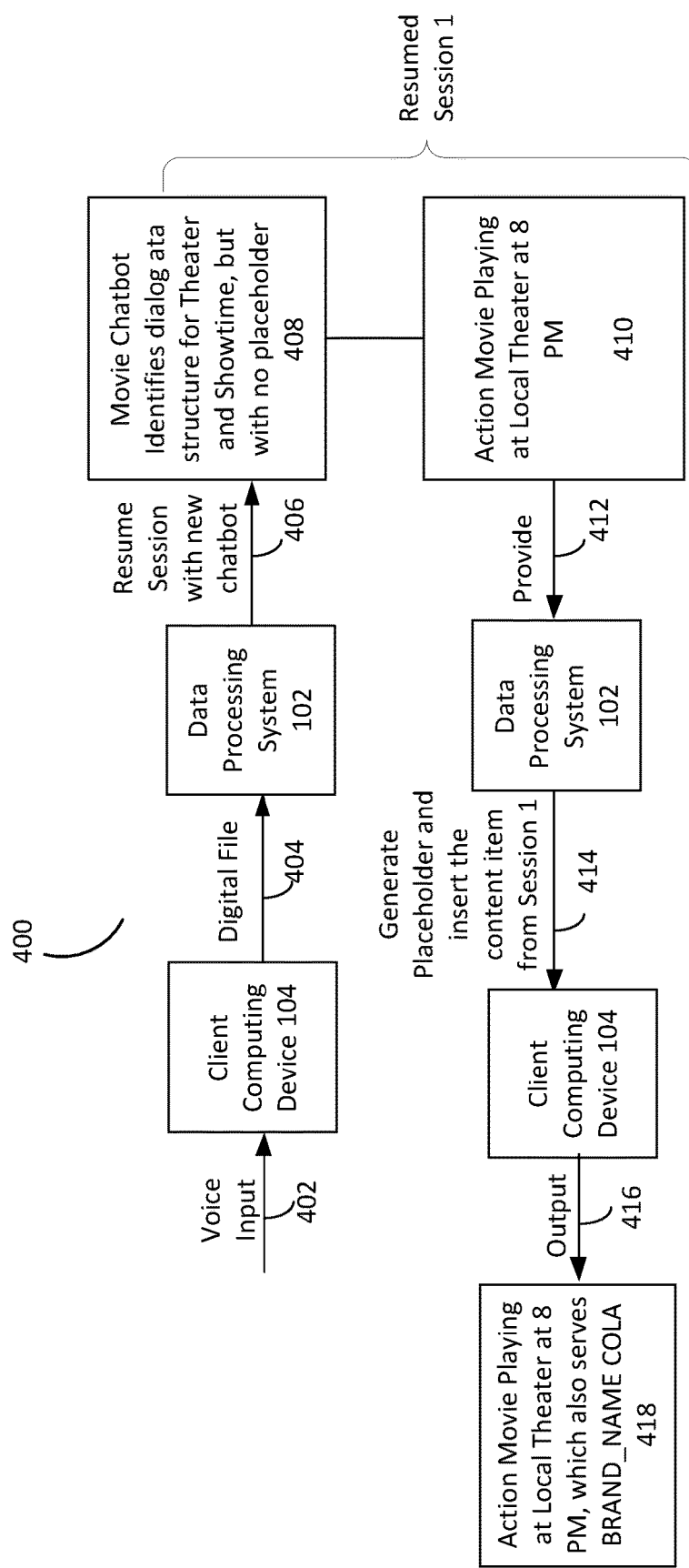
FIG. 4 is an illustration of an operation of a system to balance data requests for modification of computer program output based on a session.

FIG. 4 is an illustration of an operation of a system 400 to balance data requests for modification of computer program output based on a session. At ACT 402, the client computing device 104 can receive voice input (or other input such as image, video, or other non-text input). At ACT 404, the client computing device transmits a digital file corresponding to the voice input to the data processing system 102. The data processing system 102 can process the digital file and select a chatbot. The data processing system 102 can further determine to resume a previous Session 1. For example, even though the data processing system 102 (or third-party chatbot provider platform 146) invokes a new chatbot, the data processing system 102 can determine to resume previous Session 1 based on other attributes associated with the digital file (e.g., same computing device 104, temporal information, location information, semantic analysis, opportunities for insertion of the same content item, or historical network activity indicative of interaction with the content item presented in Session 1).

In some cases, the input 402 can include image or video input in addition to, or instead of, voice input. The computing device 104 can use one or more imaging techniques (e.g., computer vision, machine learning, image recognition, or image interpretation) to process or analyze the image, and convert the image to the digital file. In some cases, the computing device 104 can convert the image or video input to a digital file without performing an imaging technique to further process, analyze or interpret the image. Instead, the computing device 104 can forward or transmit the digital file corresponding to the input image or video to the data processing system for further image processing. The data processing system 102 can process the digital file corresponding to the image or video input to determine that the input 302 corresponds to the previous Session 1. The images and videos can be processed or parsed to obtain the same type of information that is obtained when the voice input 402 is processed or parsed.

At ACT 406, the data processing system 102 resumes Session 1 with a second chatbot. The second chatbot can be, for example, a movie chatbot. The movie chatbot can identify, based on the request or query in the digital file 404, a dialog data structure for theater and show time information 408. However, in this example, the theater and show time dialog data structure may not include a placeholder as follows: "Action Movie Playing at Local Theater at 8 PM" 410.

At ACT 412, the chatbot (or other entity) can provide the identified dialog data structure 410 to the data processing system 102. In some cases, the data processing system 102 can intercept the dialog data structure 410. For example, the data processing system 102 can be intermediary to the computing device and third-party chatbot platform 146. The data processing system 102 can parse or otherwise process the second dialog data structure and determine (e.g., via a placeholder generation component) to insert a placeholder field or directly insert a content item into the dialog data structure. The data processing system 102 can provide the modified dialog data structure with the same content item selected form Session 1 to the client computing device at ACT 414. At ACT 416, the client computing device 104 can output the dialog data structure with the content item as follows: "Action Movie Playing at Local Theater at 8 PM, which also serves Brand_Name Cola" 418. In this example, since the data processing system 102 is inserting the content item where there is no placeholder field, the data processing system can add a phrase to integrate the content item "Brand_Name" into the dialog data structure. The data processing system 102 can modify the grammar or syntax of the dialog data structure to integrate the content item. The data processing system 102 can be pre-configured with patterns that facilitate identifying a grammar or syntax of the dialog data structure, and identifying a template to use to modify the grammar or syntax of the dialog data structure.

Figure 5:
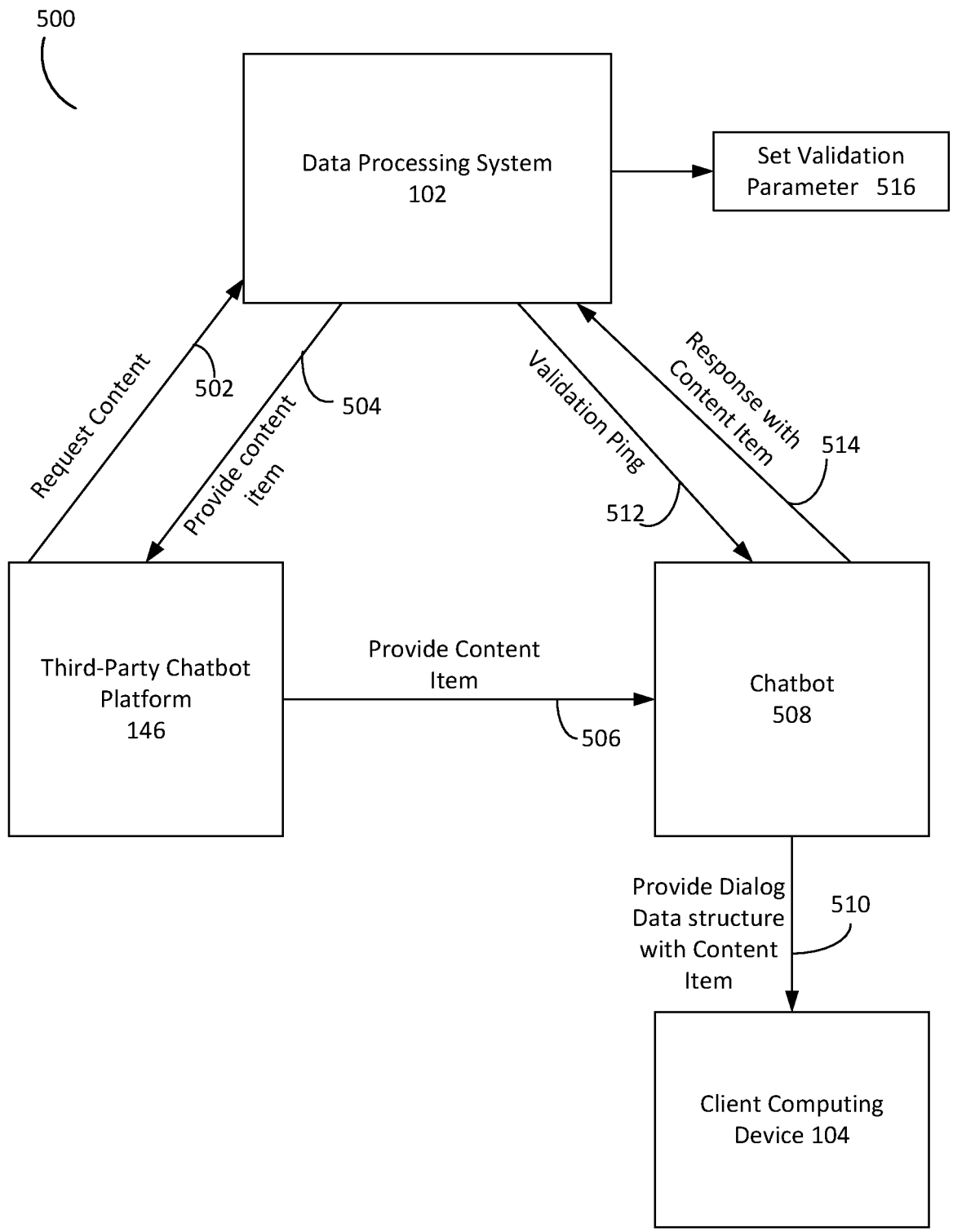
FIG. 5 is an illustration of an operation of a system to validate modification of computer program output via a network.

FIG. 5 is an illustration of an operation of a system 500 to validate modification of computer program output via a network. At ACT 502, the data processing system 102 can receive a request for content from a third-party chatbot platform 146. At ACT 504, the data processing system 102 can perform a content selection process and provide the content item to the third-party chatbot platform 146. At ACT 506, the third-party chatbot platform 146 can provide the content item to a chatbot 508. The chatbot 508 can be a computer program executing on the third-party chatbot platform 146 or a client computing device 104. At ACT 510, the chatbot 508 can provide, to the client computing device 104, a dialog data structure modified with the content item. To determine whether the content item provided at ACT 510 to the computing device 104 is the same content item provided by the data processing system 102 to the third-party chatbot platform 146 at ACT 504, the data processing system 102 can transmit a validation ping at ACT 512 to the chatbot 508. The validation ping 512 can request an indication of the content item provided at ACT 510 to the computing device 104. At ACT 514, the chatbot 508 can response to the validation ping with an indication of the content item, such as a content item identifier, keywords of the content item, a timestamp of the content item or other information indicative of the presentation of the content item.

The data processing system 102 can compare the indication of the content item received at ACT 514 with the content item provided at ACT 5045 to set a validation parameter 516. For example, if the content items match, then the data processing system 102 can validate the third-party chatbot platform 146. If the content items do not match, the data processing system 102 can invalidate the third-party chatbot platform or generate an alert or notification. The data processing system 102 can further validate or invalidate the platform 146 based on a delay between when the content item was provided to the platform 146 at ACT 504 and when the content item was provided to the chatbot at ACT 506, or at ACT 510 to the computing device 104.

The systems or operational flows 200, 300, 400, and 500 depicted in FIGS. 2-5 can include one or more component or functionality of system 100 depicted in FIG. 1. For example, the systems or operational flows 200, 300, 400, and 500 can include or be performed by a data processing system 102, client computing device 104, third-party chatbot provider device 146, or content provider device 106.

Figure 6:
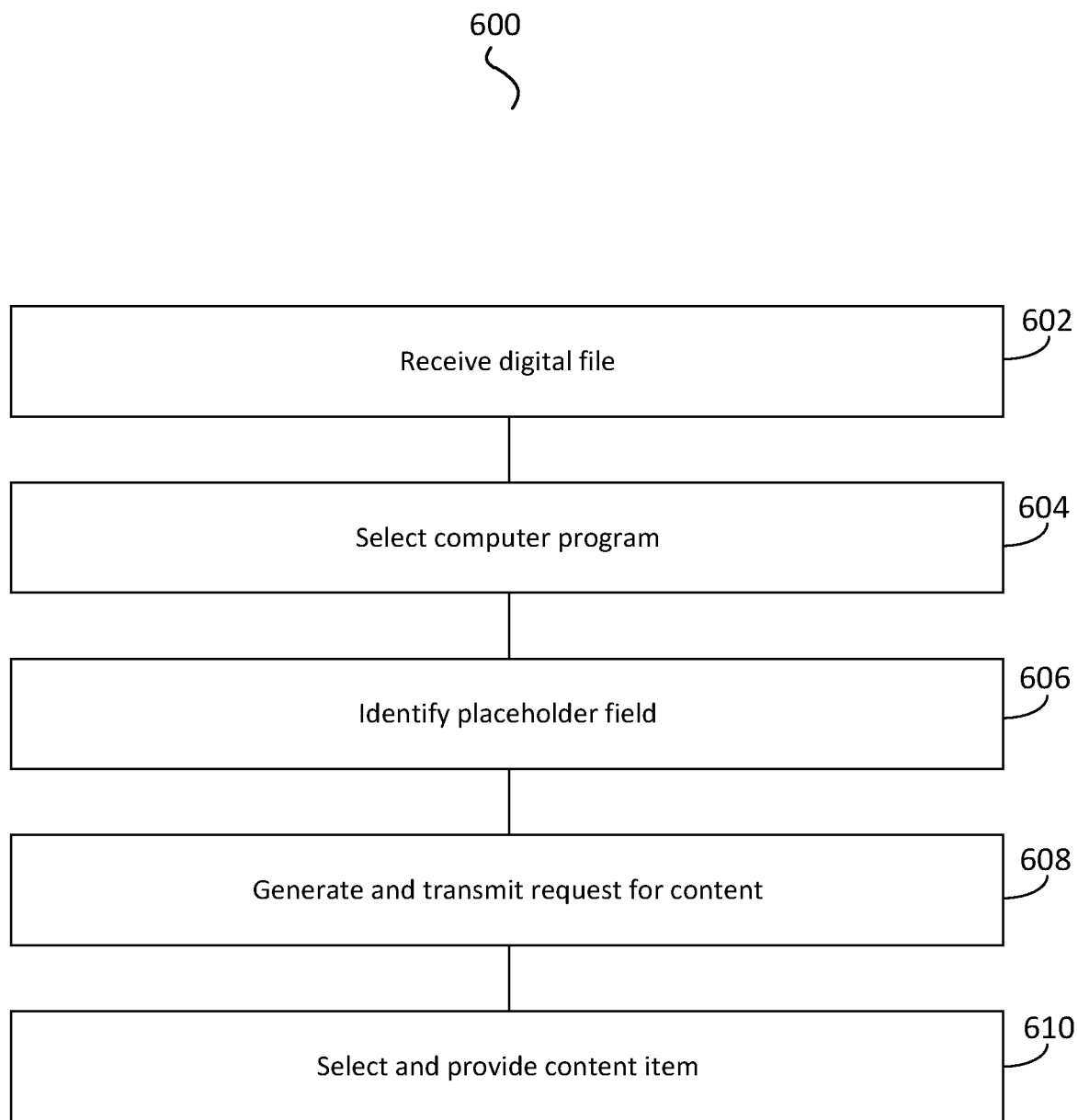
FIG. 6 is an illustration of a method of modifying computer program output via a computer network.

FIG. 6 is an illustration of a method of modifying computer program output via a computer network. The method 600 can performed by one or more component or system depicted in FIGS. 1-5, including for example, system 100, data processing system 102, computing device 104, third-party chatbot platform provider 146, chatbot provider device 108, or content provider computing device 106. At ACT 602, the data processing system can receive a digital file. The data processing system can receive the digital file from a computing device or a third-party chatbot platform. The digital file can correspond to voice input detected by a microphone of the computing device. The digital file can include a digitized representation of the analog voice input.

At ACT 604, the data processing system or third-party chatbot platform can select a computer program comprising a chatbot and invoke the chatbot. In some cases, the data processing system 102 can select and invoke the chatbot; a third-party chatbot platform can select and invoke the chatbot; or the computing device can select and invoke the chatbot. The chatbot can be selected and invoked prior to transmitting the digital file to the data processing system.

At ACT 606, a placeholder field in the dialog data structure can be identified. At ACT 608, and responsive to identifying the placeholder field, a request for content can be generated and transmitted to the data processing system. In some cases, the data processing system may not receive the digital file corresponding to the acoustic signal. For example, the data processing system can receive a request for content and information to facilitate content selection, instead of the digital file. The data processing system can receive the request for content from the third-party chatbot platform, chatbot, or computing device.

At ACT 610, the data processing system can select the content item responsive to the request, and provide the content item. The data processing system can provide the selected content item to the third-party chatbot platform, computing device, or other entity that requested the content item. The data processing system can insert the content item into the dialog data structure, and provide the modified dialog data structure for presentation via the computing device.

The data processing system can automatically generate placeholder fields for insertion into dialog data structure. The data processing system can use a template, pattern, semantic analysis, policy or rule to determine whether to insert a placeholder into a dialog data structure, and where to insert the placeholder field in the dialog data structure. In some cases, the chatbot developer can request the data processing system to determine where in the dialog data structure to insert the placeholder field. A policy or rule based on semantic analysis can include the data processing system identifying a noun in the dialog data structure, generating a keyword based on the noun, and then using the keyword to perform a content selection process to determine if there are content items provided by content providers that might match or otherwise be relevant to the noun in the dialog data structure. For example, the noun can be "soda". The data processing system can parse the noun "soda" to generate one or more keywords, such as "soda", "drink", "soft drink", "cola", "pop", or "soda pop". The data processing system can use the keyword to identify content items. The data processing system can determine to insert the placeholder field. The placeholder field can be associated with the keywords, metadata, positioning information, or other information associated with the dialog data structure. The placeholder can be associated with an identifier of the placeholder field. In some cases, the data processing system can determine to insert the placeholder field responsive to identifying at least one content that has a relevancy score greater than a threshold with respect to the noun in the dialog data structure.

Thus, the data processing system can generate the second placeholder field for the second dialog data structure and compare the second placeholder field with the first placeholder field of the first dialog data structure to determine, based on the comparison, whether to generate a second request for second content in the parameterized format. For example, the data processing system can compare the identifiers of the placeholder fields, keywords of the placeholder field, metadata, or position information (e.g., within first three words of dialog data structure, or last three words). The data processing system can determine, based on comparison of the placeholder fields, that there is a similarity between the placeholder field (e.g., similar or same keywords). For example, both placeholder fields can be for a brand of soda, in which case the data processing system can reuse the content item from the first placeholder field. The data processing system can determine, based on the comparison, not to request a second content item for the second placeholder field of the second dialog data structure because the data processing system can reuse the content item selected for the first placeholder field for insertion into the second placeholder field of the second dialog data structure.

If, however, the data processing system determines based on the comparison that the placeholder fields are not similar or different (e.g., different keywords or keywords do not match), the data processing system can determine to select a new, second content item. For example, the first placeholder field (or first dialog data structure) can be associated with keywords for soda, while the second placeholder field (or second dialog data structure) can be associated with keywords for luxury cars.

Figure 7:
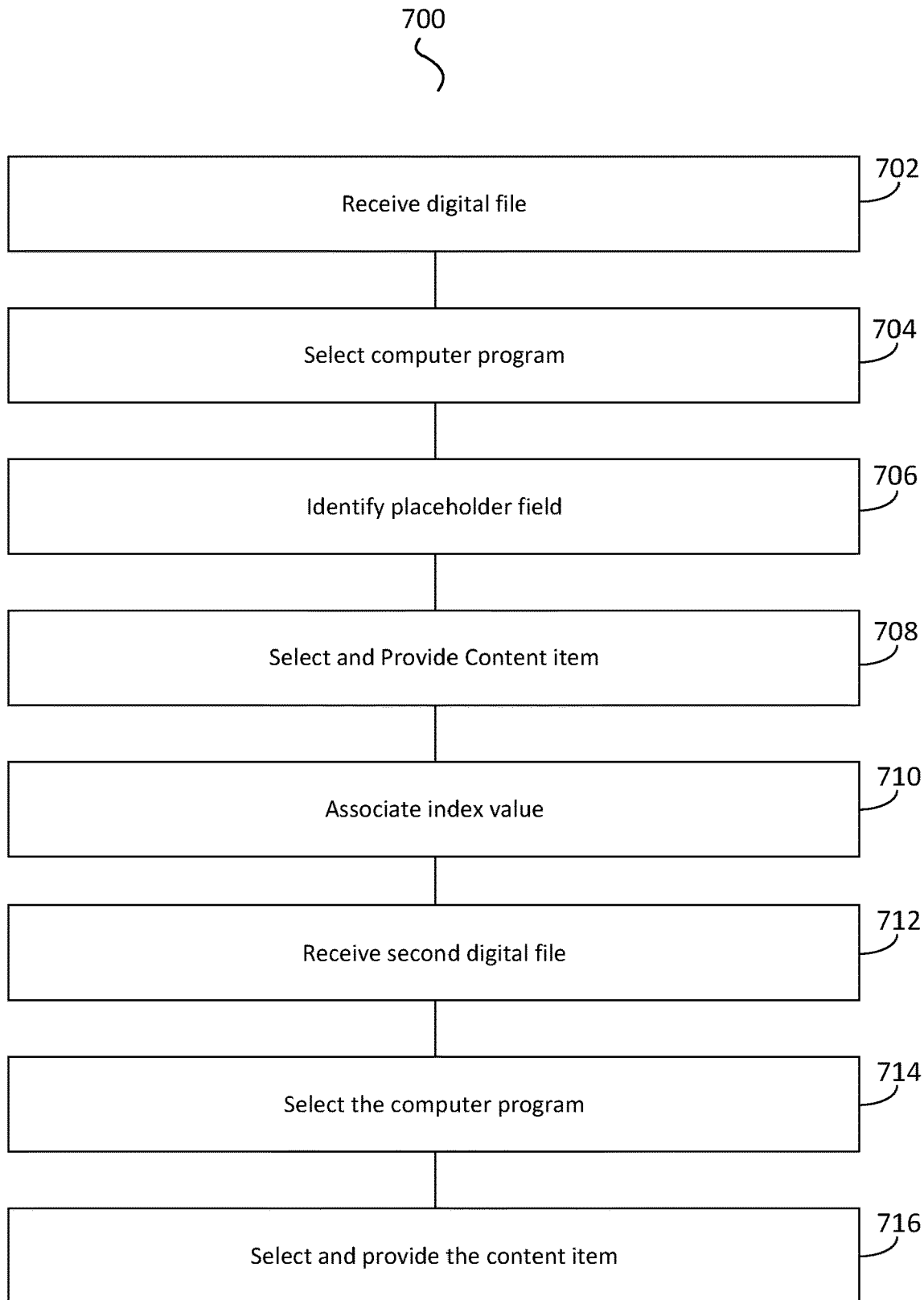
FIG. 7 is an illustration of a method of balancing data requests to modify computer program output via a computer network.

FIG. 7 is an illustration of a method of balancing data requests to modify computer program output via a computer network. The method 700 can be performed by one or more component or system depicted in FIGS. 1-5, including for example, system 100, data processing system 102, computing device 104, third-party chatbot platform provider 146, chatbot provider device 108, or content provider computing device 106. At ACT 702, the data processing system can receive a digital file. The data processing system can receive the digital file from a computing device or a third-party chatbot platform. The digital file can correspond to voice input detected by a microphone of the computing device. The digital file can include a digitized representation of the analog voice input. The digital file can be pre-processed to include keywords or tokens associated with the voice input. In some cases, the data processing system may not receive the digital file and, instead, receive the request for content with information about the digital file that can facilitate content selection.

At ACT 704, the data processing system or third-party chatbot platform can select a computer program comprising a chatbot and invoke the chatbot. In some cases, the data processing system 102 can select and invoke the chatbot; a third-party chatbot platform can select and invoke the chatbot; or the computing device can select and invoke the chatbot. The chatbot can be selected and invoked prior to transmitting the digital file to the data processing system.

At ACT 706, a placeholder field in the dialog data structure can be identified. At ACT 708, the data processing system can select the content item and provide the content item. The data processing system can provide the selected content item to the third-party chatbot platform, computing device, or other entity that requested the content item. The data processing system can insert the content item into the dialog data structure, and provide the modified dialog data structure for presentation via the computing device.

At ACT 710, the data processing system can facilitate reducing the utilization of computing resources by storing the content item in memory. The data processing system can associate the content item with an index value based on information associated with the presentation of the content item. For example, the index value can be generated based on one or more identifiers associated with the content item, computing device, chatbot, dialog data structure, keyword, topic, or location. The index value can be generated based on identifiers that are relevant to the session and can be used to determine whether to resume the session, identify which session to resume, or start a new session.

At ACT 712, the data processing system can receive a second digital file or a second request for content with information to facilitate content selection. At ACT 714, the data processing system can select or invoke the same chatbot that was invoked at ACT 704. For cases in which another device or entity selects and invokes the chatbot, the data processing system at ACT 714 can receive an indication of the chatbot that is active.

At ACT 716, the data processing system can determine to provide the same content item provided at ACT 708. The data processing system can determine, for example, that the same content item is relevant to the second dialog data structure.

The data processing system can determine to reuse content items based on the voice input, or determine not to reuse content items based on the comparison of voice input with previous voice input. For example, if the later received voice input is different from the previously received voice input with respect to keywords, content, context, or other parameters, the data processing system can determine not to reuse the content item. In some cases, the data processing system can determine to not reuse content items from a different session. Two session can be different if, for example, they are separated in time by greater than a threshold, correspond to different end users, have different voice input with different acoustic fingerprints, or different geographic locations.

For example, the data processing system can receive a third or subsequent digital file corresponding to a fifth or subsequent acoustic signal carrying third or subsequent voice content detected by the microphone on the computing device. The data processing system can select, responsive to the third voice content of the third digital file, the computer program comprising the chatbot. The data processing system can identify, via the chatbot based on the third voice content of the third digital file, a third or subsequent dialog data structure comprising a third placeholder field. The data processing system can generate a second or new index value based on a combination of the first identifier, the third identifier, and a fifth identifier of the third dialog data structure. The data processing system can determine, based on a comparison of the index value with the second index value, not to reuse the content item. The data processing system can select, responsive to identification of the third placeholder and based on a combination of the first identifier of the chatbot, the third identifier of the computing device, and the fifth identifier of the third dialog data structure, a second content item to provision to the computing device to cause the computing device to perform the parametrically driven text to speech technique to generate a sixth or subsequent acoustic signal corresponding to the third dialog data structure modified with the second content item.

Figure 8:
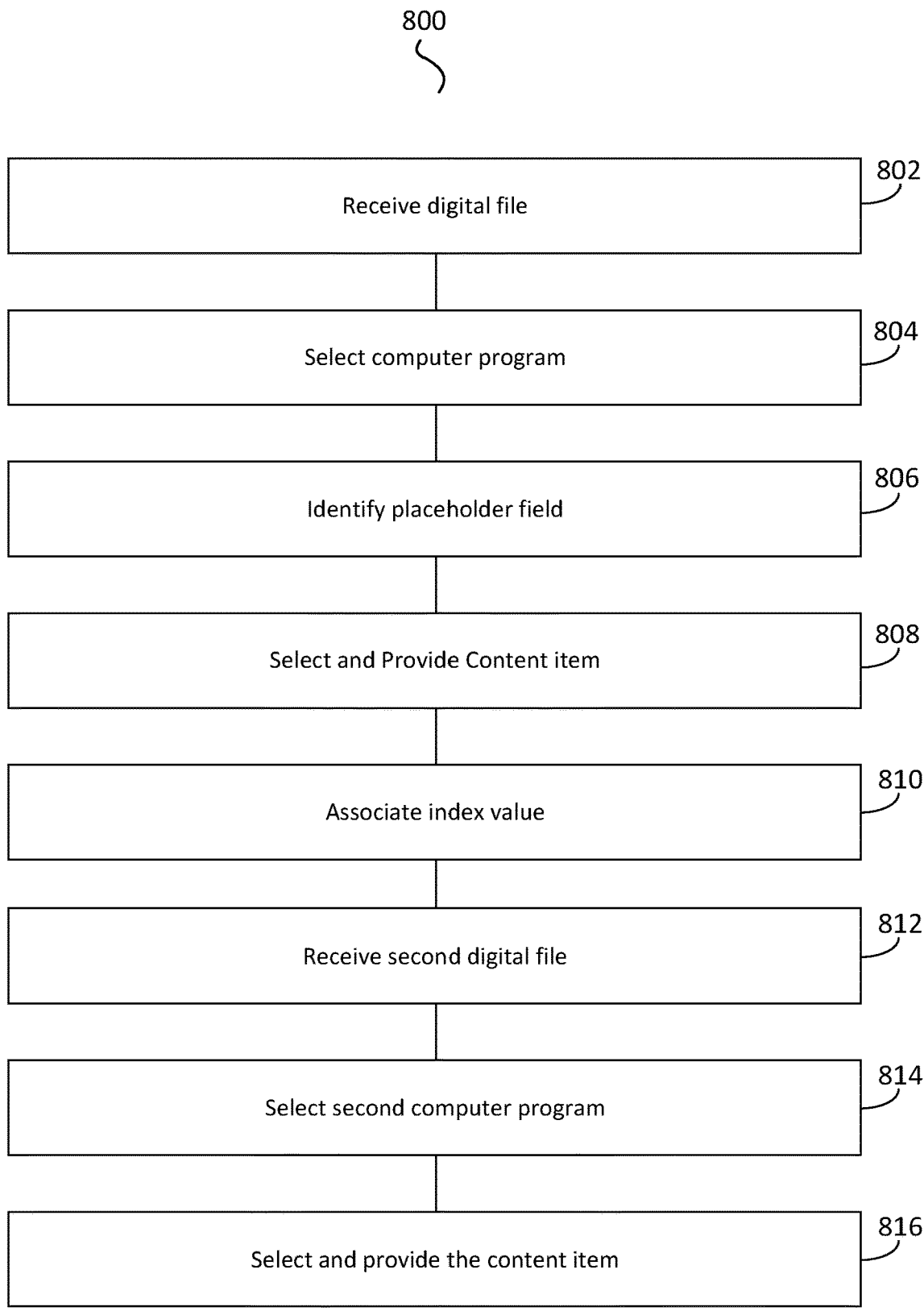
FIG. 8 is an illustration of a method of balancing data requests to modify computer program output via a computer network.

FIG. 8 is an illustration of a method of balancing data requests to modify computer program output via a computer network. The method 800 can performed by one or more component or system depicted in FIGS. 1-5, including for example, system 100, data processing system 102, computing device 104, third-party chatbot platform provider 146, chatbot provider device 108, or content provider computing device 106. At ACT 802, the data processing system can receive a digital file. The data processing system can receive the digital file from a computing device or a third-party chatbot platform. The digital file can correspond to voice input detected by a microphone of the computing device. The digital file can include a digitized representation of the analog voice input. The digital file can be pre-processed to include keywords or tokens associated with the voice input. In some cases, the data processing system may not receive the digital file and, instead, receive the request for content with information about the digital file that can facilitate content selection.

At ACT 804, the data processing system or third-party chatbot platform can select a computer program comprising a chatbot and invoke the chatbot. In some cases, the data processing system 102 can select and invoke the chatbot; a third-party chatbot platform can select and invoke the chatbot; or the computing device can select and invoke the chatbot. The chatbot can be selected and invoked prior to transmitting the digital file to the data processing system.

At ACT 806, a placeholder field in the dialog data structure can be identified. At ACT 808, the data processing system can select the content item and provide the content item. The data processing system can provide the selected content item to the third-party chatbot platform, computing device, or other entity that requested the content item. The data processing system can insert the content item into the dialog data structure, and provide the modified dialog data structure for presentation via the computing device.

At ACT 810, the data processing system can facilitate reducing the utilization of computing resources by storing the content item in memory. The data processing system can associate the content item with an index value based on information associated with the presentation of the content item. For example, the index value can be generated based on one or more identifiers associated with the content item, computing device, chatbot, dialog data structure, keyword, topic, or location. The index value can be generated based on identifiers that are relevant to the session and can be used to determine whether to resume the session, identify which session to resume, or start a new session.

At ACT 812, the data processing system can receive a second digital file or a second request for content with information to facilitate content selection. At ACT 814, the data processing system can select a second computer program comprising a second chatbot that is different from the previously invoked chatbot at ACT 804. The data processing system can receive an indication of the second chatbot, which may be selected by a third-party. At ACT 816, the data processing system can determine that the previously selected content item at ACT 808 is relevant to a second dialog data structure being provided by the second chatbot, and determine to reuse the same content item in order to reduce resource utilization.

Figure 9:
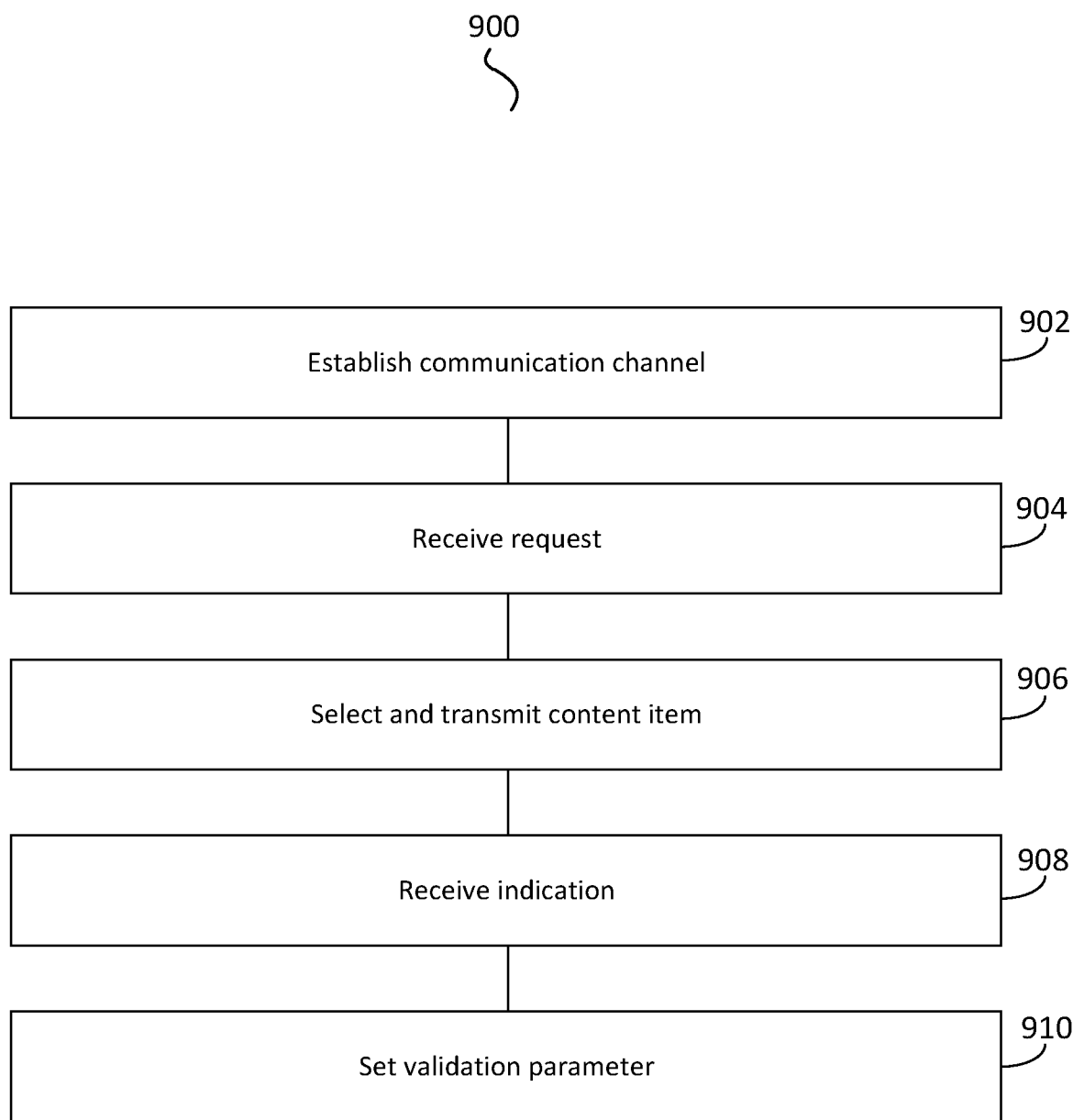
FIG. 9 is an illustration of a method of validating computer program output via a computer network.

FIG. 9 is an illustration of a method of validating computer program output via a computer network. The method 900 can performed by one or more component or system depicted in FIGS. 1-5, including for example, system 100, data processing system 102, computing device 104, third-party chatbot platform provider 146, chatbot provider device 108, or content provider computing device 106. At ACT 902, the data processing system can establish a communication channel with a server of a third-party chatbot platform. The communication channel can be secure by, for example, utilization an encryption technique. The data processing system can use a handshaking protocol to establish the communication channel.

At ACT 904, the data processing system can receive a request for content from the third-party server. The request for content can be triggered by the chatbot. The request for content can be responsive to the chatbot generating a query. At ACT 906, the data processing system can select a content item and provide the content item to the third-party server of the third-party chatbot platform. The third-party server can be instructed to forward the content item to the chatbot for presentation to a user of a computing device.

At ACT 908, the data processing system can receive an indication of the content item from the chatbot. For example, the data processing system can ping the chatbot for the indication of the content item. At ACT 910, the data processing system can set a validation parameter based on a comparison of the indication of the content item and the selected content item provided by the data processing system to the third-party server of the third-party chatbot platform. The validation parameter can indicate whether the content items match or whether the content item was timely provided to the chatbot.

Figure 10:
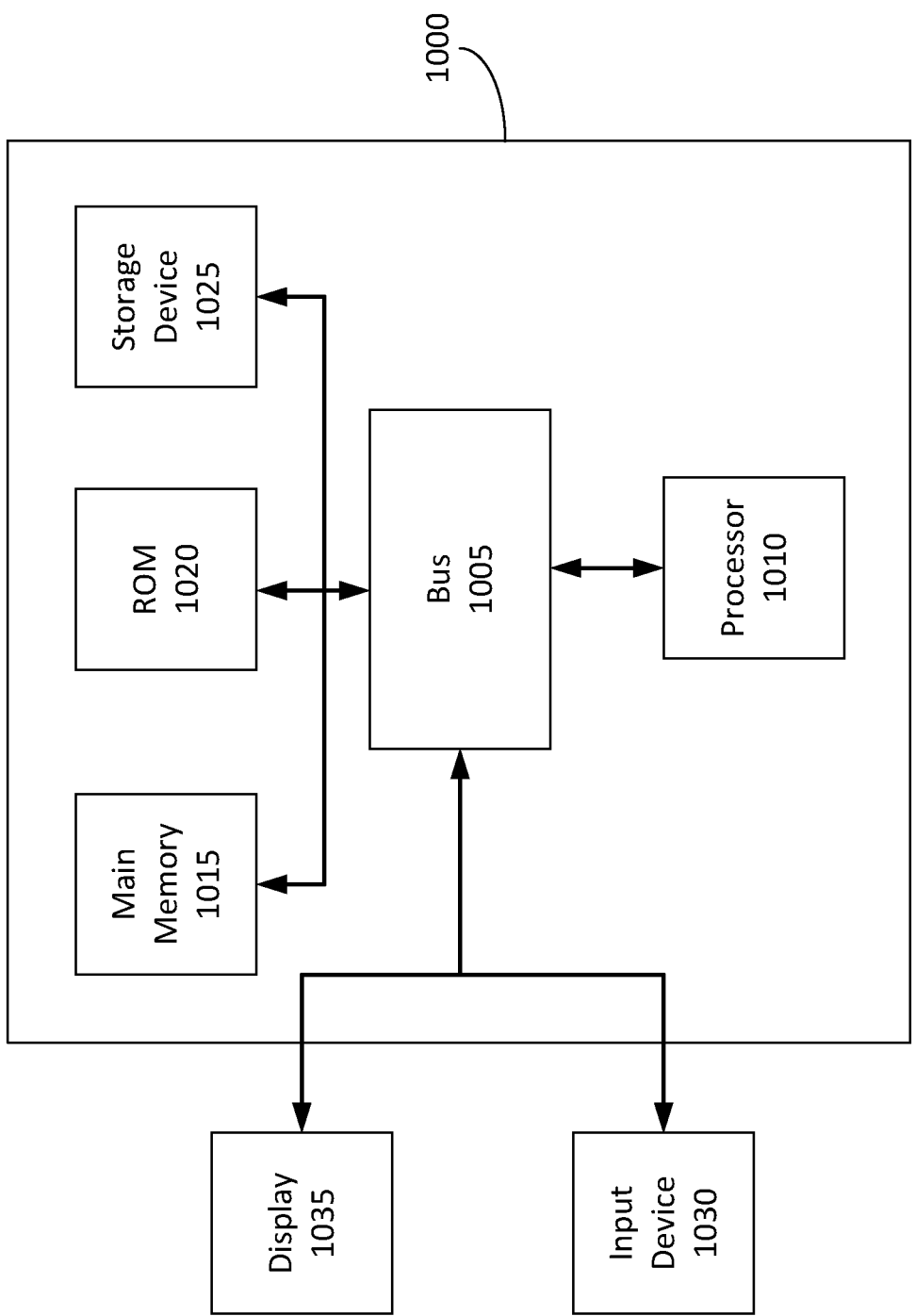
FIG. 10 is a block diagram illustrating a general architecture for a computer system that can be employed to implement elements of the systems and methods described and illustrated herein.

FIG. 10 is a block diagram of an example computer system 1000. The computer system or computing device 1000 can include or be used to implement the system 100, or its components such as the data processing system 102. The data processing system 102 can include an intelligent personal assistant or voice-based digital assistant. The computing system 1000 includes a bus 1005 or other communication component for communicating information and a processor 1010 or processing circuit coupled to the bus 1005 for processing information. The computing system 1000 can also include one or more processors 1010 or processing circuits coupled to the bus for processing information. The computing system 1000 also includes main memory 1015, such as a random access memory (RAM) or other dynamic storage device, coupled to the bus 1005 for storing information, and instructions to be executed by the processor 1010. The main memory 1015 can be or include the data repository 145. The main memory 1015 can also be used for storing position information, temporary variables, or other intermediate information during execution of instructions by the processor 1010. The computing system 1000 may further include a read-only memory (ROM) 1020 or other static storage device coupled to the bus 1005 for storing static information and instructions for the processor 1010. A storage device 1025, such as a solid-state device, magnetic disk or optical disk, can be coupled to the bus 1005 to persistently store information and instructions. The storage device 1025 can include or be part of the data repository 145.

The computing system 1000 may be coupled via the bus 1005 to a display 1035, such as a liquid crystal display, or active matrix display, for displaying information to a user. An input device 1030, such as a keyboard including alphanumeric and other keys, may be coupled to the bus 1005 for communicating information and command selections to the processor 1010. The input device 1030 can include a touch screen display 1035. The input device 1030 can also include a cursor control, such as a mouse, a trackball, or cursor direction keys, for communicating direction information and command selections to the processor 1010 and for controlling cursor movement on the display 1035. The display 1035 can be part of the data processing system 102, the client computing device 150 or other component of FIG. 1, for example.

The processes, systems and methods described herein can be implemented by the computing system 1000 in response to the processor 1010 executing an arrangement of instructions contained in main memory 1015. Such instructions can be read into main memory 1015 from another computer-readable medium, such as the storage device 1025. Execution of the arrangement of instructions contained in main memory 1015 causes the computing system 1000 to perform the illustrative processes described herein. One or more processors in a multi-processing arrangement may also be employed to execute the instructions contained in main memory 1015. Hard-wired circuitry can be used in place of or in combination with software instructions together with the systems and methods described herein. Systems and methods described herein are not limited to any specific combination of hardware circuitry and software.

Although an example computing system has been described in FIG. 10, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the interface 110, content selector component 118, or NLP component 112 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 1000 can include clients and servers. A client and server are generally remote from each other and typically interact through a communication network (e.g., the network 165). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 150 or the content provider computing device 155 or the chatbot provider computing device 160).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the content selector component 118, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. For example, the data processing system 102 can select a content item for a subsequent action (e.g., for the third action 215) based in part on data from a prior action in the sequence of actions of the thread 200, such as data from the second action 210 indicating that the second action 210 is complete or about to begin. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system to modify computer program output, comprising:
   a data processing system having one or more processors and memory to:
   receive, from a computing device, a digital file corresponding to a first acoustic signal carrying voice content detected by a microphone of the computing device, the first acoustic signal converted to the digital file by an analog to digital converter of the computing device;
   select, responsive to the voice content of the digital file, a computer program comprising a chatbot from a plurality of computer programs comprising chatbots for execution;
   identify, via the chatbot based on the voice content of the digital file, a dialog data structure comprising a placeholder field;
   generate, responsive to identification of the placeholder field in the dialog data structure, a request for content in a parameterized format configured for a parametrically driven text to speech technique;
   transmit the request for the content to a content selection component of the data processing system;
   select, via a content selection process responsive to the request, a content item for insertion into the placeholder field of the dialog data structure, the content item in the parameterized format configured for the parametrically driven text to speech technique; and
   provide, to the chatbot, the content item in the parameterized format selected via the content selection process to cause the computing device to perform the parametrically driven text to speech technique to generate a second acoustic signal corresponding to the dialog data structure modified with the content item, wherein the computing device plays the content item with an acoustic fingerprint corresponding to the chatbot.

2. The system of claim 1, comprising the data processing system to:
   determine, based on an identifier of the computing device and via a lookup in a data repository, that the computing device is authorized to access the computer program comprising the chatbot; and
   select the computer program comprising the chatbot responsive to the determination that the computing device is authorized to access the chatbot.

3. The system of claim 1, comprising:
   the chatbot configured to use a natural language processing technique to identify the dialog data structure responsive to the digital file.

4. The system of claim 1, wherein the dialog data structure comprises a tag that identifies the placeholder field and metadata of the placeholder field.

5. The system of claim 1, comprising the data processing system to:
   use a natural language processing technique to process the dialog data structure and identify a portion of the dialog data structure at which to insert the placeholder field; and
   insert the placeholder field at the portion of the dialog data structure.

6. The system of claim 1, comprising the data processing system to:
   use a natural language processing technique to identify a grammar and syntax of the dialog data structure;
   insert, based on the grammar and syntax of the dialog data structure, the placeholder field; and
   provide, to the chatbot, the dialog data structure comprising the placeholder field.

7. The system of claim 1, comprising the data processing system to:
   generate a second dialog data structure comprising a second placeholder field;
   compare the second placeholder field with the placeholder field;
   determine, based on the comparison, to generate a second request for second content in the parameterized format; and
   select a second content item for insertion into the second placeholder field of the second dialog data structure.

8. The system of claim 1, comprising the data processing system to:
   generate a second dialog data structure comprising a second placeholder field;
   compare the second placeholder field with the placeholder field; and
   determine, based on the comparison, to insert the content item selected for insertion in the placeholder into the second placeholder field of the second dialog data structure.

9. The system of claim 1, comprising the data processing system to:

generate a second dialog data structure comprising a second placeholder field;

compare the second placeholder field with the placeholder field;

determine, based on the comparison, not to request a second content item for the second placeholder field of the second dialog data structure; and reuse the content item selected for the placeholder field for insertion into the second placeholder field of the second dialog data structure.

10. The system of claim 1, comprising the data processing system to:

select, via the content selection process, the content item for insertion based on profile information linked to the computing device.

11. The system of claim 1, comprising the data processing system to:

select, via the content selection process, the content item for insertion based on a plurality of digital files corresponding to the computing device.

12. A method of modifying computer program output, comprising:

detecting, by a sensor of a computing device, a first image comprising visual content;

converting, by the computing device, the first image to a digital file corresponding to the visual content;

selecting, responsive to the visual content of the digital file, a computer program comprising a chatbot from a plurality of computer programs comprising chatbots for execution;

identifying, by the chatbot based on the visual content of the digital file, a dialog data structure comprising a placeholder field;

generating, responsive to identifying the placeholder field in the dialog data structure, a request for content in a parameterized format configured for a parametrically driven text to speech technique;

transmitting, by the chatbot, the request for the content to a content selection server;

selecting, by the content selection server responsive to the request, a content item for insertion into the placeholder field of the dialog data structure, the content item in the parameterized format configured for the parametrically driven text to speech technique; and providing, to the chatbot via a secure network communication channel, the content item for insertion in the dialog data structure by the chatbot, the content item provided in the parameterized format selected via the content selection process to cause the computing device to perform the parametrically driven text to speech technique to generate an acoustic signal corresponding to the dialog data structure modified with the content item.

13. The method of claim 12, comprising:

determining, based on a lookup in a data repository with an identifier of the computing device, that the computing device is authorized to access the computer program comprising the chatbot; and selecting the computer program comprising the chatbot responsive to the determination that the computing device is authorized to access the chatbot.

14. The method of claim 12, comprising:

using a machine learning image processing technique to identify the dialog data structure responsive to the digital file.

15. The method of claim 12, wherein the dialog data structure comprises a tag identifying the placeholder field and metadata of the placeholder field.

16. The method of claim 12, comprising:

using a natural language processing technique to process the dialog data structure and identify a portion of the dialog data structure at which to insert the placeholder field; and inserting the placeholder field at the portion of the dialog data structure.

17. The method of claim 12, comprising:

using a natural language processing technique to identify a grammar and syntax of the dialog data structure;

inserting, based on the grammar and syntax of the dialog data structure, the placeholder field; and providing, to the chatbot, the dialog data structure comprising the placeholder field.

18. The method of claim 12, comprising:

generating a second dialog data structure comprising a second placeholder field;

comparing the second placeholder field with the placeholder field;

determining, based on the comparison, to generate a second request for second content in the parameterized format; and selecting a second content item for insertion into the second placeholder field of the second dialog data structure.

* * * * *